United States Patent
Yu et al.

(10) Patent No.: US 10,742,682 B2
(45) Date of Patent: Aug. 11, 2020

(54) ATTACK DATA PACKET PROCESSING METHOD, APPARATUS, AND SYSTEM

(71) Applicant: Huawei Technologies Co., Ltd., Shenzhen (CN)

(72) Inventors: Qinghua Yu, Shenzhen (CN); Xinhua Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 15/630,190

(22) Filed: Jun. 22, 2017

(65) Prior Publication Data

US 2017/0295207 A1 Oct. 12, 2017

Related U.S. Application Data

(63) Continuation of application No. PCT/CN2015/096509, filed on Dec. 6, 2015.

(30) Foreign Application Priority Data

Dec. 22, 2014 (CN) .......................... 2014 1 0810857

(51) Int. Cl.
*H04L 29/06* (2006.01)
*H04L 12/741* (2013.01)
*G06F 9/455* (2018.01)

(52) U.S. Cl.
CPC .............. *H04L 63/20* (2013.01); *H04L 29/06* (2013.01); *H04L 45/54* (2013.01);
(Continued)

(58) Field of Classification Search
None
See application file for complete search history.

(56) References Cited

U.S. PATENT DOCUMENTS 9,009,828 B1 * 4/2015 Ramsey .................. G06F 16/22
726/23
9,338,181 B1 * 5/2016 Burns ................. H04L 63/1433
(Continued)

FOREIGN PATENT DOCUMENTS

CN 1588880 A 3/2005
CN 103051557 A 4/2013
(Continued)

OTHER PUBLICATIONS

Kreutz et al. "Software-Defined Networking: A Comprehensive Survey", arXiv: 1406.4440v3 Oct. 2014.*
(Continued)

*Primary Examiner* — Piotr Poltorak
(74) *Attorney, Agent, or Firm* — Conley Rose, P.C.

(57) ABSTRACT

An attack data packet processing method, an apparatus, and a system are provided. The method includes receiving, by a management node, description information of an attack data packet and an attack type of the attack data packet, where the description information and the attack type are sent by an awareness node; determining a processing policy on the attack data packet of the attack type according to the attack type; and sending the description information and the processing policy to a switch using a software-defined networking controller, so that the switch performs an operation indicated by the processing policy on the attack data packet with the description information.

19 Claims, 13 Drawing Sheets

(52) U.S. Cl.
CPC .......... *H04L 63/1441* (2013.01); *H04L 69/22* (2013.01); *G06F 9/45558* (2013.01)

(56) References Cited

U.S. PATENT DOCUMENTS

| | | | |
|---|---|---|---|
| 9,350,677 B2* | 5/2016 | Mann | H04L 47/28 |
| 2004/0172557 A1* | 9/2004 | Nakae | H04L 63/0227 726/22 |
| 2005/0251859 A1* | 11/2005 | Quittek | H04L 63/0236 726/22 |
| 2006/0004868 A1* | 1/2006 | Claudatos | G06Q 10/10 |
| 2006/0075093 A1 | 4/2006 | Frattura et al. | |
| 2006/0140127 A1* | 6/2006 | Lee | H04L 43/18 370/241 |
| 2007/0118894 A1* | 5/2007 | Bhatia | H04L 63/1458 726/13 |
| 2007/0153689 A1* | 7/2007 | Strub | H04L 63/1441 370/230 |
| 2007/0234414 A1* | 10/2007 | Liu | H04L 63/0218 726/11 |
| 2008/0059596 A1 | 3/2008 | Ogawa | |
| 2009/0007100 A1* | 1/2009 | Field | G06F 21/53 718/1 |
| 2009/0125573 A1* | 5/2009 | Hardy | G06F 3/0623 |
| 2009/0249440 A1* | 10/2009 | Platt | H04L 63/0815 726/1 |
| 2009/0249472 A1* | 10/2009 | Litvin | H04L 63/0263 726/14 |
| 2009/0262741 A1* | 10/2009 | Jungck | H04L 29/12066 370/392 |
| 2010/0067391 A1* | 3/2010 | Chang | H04L 63/1441 370/252 |
| 2011/0072486 A1* | 3/2011 | Hadar | G06F 21/6218 726/1 |
| 2011/0138441 A1* | 6/2011 | Neystadt | G06F 9/5077 726/1 |
| 2011/0231361 A1* | 9/2011 | Patchava | G06F 21/50 707/602 |
| 2012/0054866 A1* | 3/2012 | Evans | H04L 63/1416 726/23 |
| 2012/0120964 A1* | 5/2012 | Koponen | H04L 41/0816 370/409 |
| 2013/0125230 A1* | 5/2013 | Koponen | H04L 41/0823 726/13 |
| 2013/0283374 A1* | 10/2013 | Zisapel | H04L 63/1441 726/22 |
| 2013/0311675 A1* | 11/2013 | Kancherla | H04L 43/026 709/244 |
| 2013/0332983 A1* | 12/2013 | Koorevaar | H04L 63/20 726/1 |
| 2013/0333029 A1* | 12/2013 | Chesla | H04L 45/74 726/22 |
| 2014/0016501 A1* | 1/2014 | Kamath | H04L 69/22 370/253 |
| 2014/0052877 A1* | 2/2014 | Mao | H04L 61/103 709/245 |
| 2014/0089506 A1* | 3/2014 | Puttaswamy Naga | H04L 63/20 709/225 |
| 2014/0115062 A1* | 4/2014 | Liu | H04L 29/08729 709/204 |
| 2014/0157356 A1* | 6/2014 | Lee | H04L 63/0263 726/1 |
| 2014/0173018 A1* | 6/2014 | Westphal | H04L 45/123 709/213 |
| 2014/0245423 A1* | 8/2014 | Lee | H04L 63/0218 726/12 |
| 2014/0280817 A1* | 9/2014 | Uppalapati | H04L 41/044 709/223 |
| 2014/0282854 A1* | 9/2014 | Clark | H04L 63/20 726/1 |
| 2014/0301192 A1* | 10/2014 | Lee | H04L 45/02 370/230 |
| 2014/0317293 A1* | 10/2014 | Shatzkamer | G06F 9/45558 709/226 |
| 2014/0317684 A1* | 10/2014 | Porras | H04L 63/20 726/1 |
| 2014/0348172 A1 | 11/2014 | Akiyoshi | |
| 2015/0088827 A1* | 3/2015 | Xu | G06F 3/0643 707/634 |
| 2015/0089331 A1* | 3/2015 | Skerry | G06F 9/45533 714/799 |
| 2015/0113132 A1* | 4/2015 | Srinivas | H04L 41/0816 709/224 |
| 2015/0150073 A1* | 5/2015 | Bhalerao | H04L 63/20 726/1 |
| 2015/0169345 A1* | 6/2015 | DeCusatis | G06F 9/45558 718/1 |
| 2015/0188767 A1* | 7/2015 | Li | H04L 41/12 370/254 |
| 2015/0200859 A1* | 7/2015 | Li | H04L 43/0876 370/235 |
| 2015/0207813 A1* | 7/2015 | Reybok | H04L 63/145 726/22 |
| 2015/0222656 A1* | 8/2015 | Haugsnes | G06F 16/24 726/23 |
| 2015/0237013 A1* | 8/2015 | Bansal | H04L 63/0263 726/13 |
| 2015/0263960 A1* | 9/2015 | Kasturi | H04L 41/12 370/230.1 |
| 2015/0281067 A1* | 10/2015 | Wu | G06F 9/455 370/392 |
| 2015/0326425 A1* | 11/2015 | Natarajan | H04L 41/0654 370/216 |
| 2015/0334045 A1* | 11/2015 | Tremblay | H04L 45/14 709/226 |
| 2015/0341377 A1* | 11/2015 | Kasturi | H04L 67/1002 726/23 |
| 2016/0072717 A1* | 3/2016 | Ansari | H04L 45/38 370/412 |
| 2016/0080266 A1* | 3/2016 | Fujii | H04L 45/28 370/236 |
| 2016/0087894 A1* | 3/2016 | Chen | H04L 47/12 370/237 |
| 2016/0094668 A1* | 3/2016 | Chang | G06F 9/45558 709/223 |
| 2016/0119367 A1* | 4/2016 | Li | H04L 12/6418 726/1 |
| 2016/0149806 A1* | 5/2016 | Park | H04L 45/586 370/254 |
| 2016/0156702 A1* | 6/2016 | Morper | H04L 61/2015 709/223 |
| 2016/0205071 A1* | 7/2016 | Cooper | H04L 49/70 726/1 |
| 2016/0254984 A1* | 9/2016 | Tekalp | H04L 45/02 709/242 |
| 2016/0255051 A1* | 9/2016 | Williams | H04L 63/0236 726/1 |
| 2016/0294634 A1 | 10/2016 | Morimoto | |
| 2016/0301603 A1* | 10/2016 | Park | H04L 41/0893 |
| 2016/0330230 A1* | 11/2016 | Reddy | H04L 63/1433 |
| 2016/0337164 A1* | 11/2016 | Klaedtke | H04L 41/06 |
| 2016/0352528 A1* | 12/2016 | Law | H04L 12/12 |
| 2017/0142032 A1* | 5/2017 | Heinonen | H04L 12/66 |
| 2017/0195257 A1* | 7/2017 | Annaluru | H04L 49/253 |
| 2018/0184311 A1* | 6/2018 | Fiaschi | H04W 76/00 |

FOREIGN PATENT DOCUMENTS

| | | |
|---|---|---|
| CN | 103051605 A | 4/2013 |
| CN | 103152361 A | 6/2013 |
| CN | 104580168 A | 4/2015 |
| JP | 2008066945 A | 3/2008 |
| JP | 2014033463 A | 2/2014 |
| WO | 2014133025 A1 | 9/2014 |

(56) References Cited

FOREIGN PATENT DOCUMENTS

| WO | 2014148613 A1 | 9/2014 |
|---|---|---|
| WO | 2016000160 A1 | 1/2016 |

OTHER PUBLICATIONS

Simon Sharwood, "Virtual appliances vs. Physical appliances", ComputerWeekly.com, Mar. 2010.*
bigswitch.com, "Bringing Next Generation SDN Fabrics to Enterprise Data Centers", found at https://bigswitch.com/sites/default/files/aag_dell_networking.pdf, Apr. 24, 2014.*
Fayzbaksh et al., "Enforcing Network-Wide Policies in the Presence of Dynamic Middlebox Actions using FlowTags", 11th USENIX Symposium on Networked Systems Design and Implementation, ISBN 9781931971096, Apr. 2, 2014.*
Lespinasse, "A quick overview of OpenStack technology", found at https://www.ibm.com/blogs/cloud-computing/2014/08/06/quick-overview-openstack-technology/, Aug. 6, 2014.*
Berde et al., "ONOS: Towards and Open, Distributed SDN OS", ACM 9781450329897, Aug. 22, 2014.*
"Building secure telco clouds," XP055220840, Nokia Networks, Oct. 18, 2014, 28 pages.
"OpenFlow Switch Specification," XP055229242, Open Networking Foundation, Version 1.3.0 (Wire Protocol 0x04), ONF TS-006, Jun. 25, 2012, 106 pages.
Foreign Communication From A Counterpart Application, European Application No. 15871852.8, Extended European Search Report dated Nov. 20, 2017, 10 pages.
Machine Translation and Abstract of Chinese Publication No. CN1588880, Mar. 2, 2005, 13 pages.
Machine Translation and Abstract of Chinese Publication No. CN103051557, Apr. 17, 2013, 16 pages.
Machine Translation and Abstract of Chinese Publication No. CN103051605, Apr. 17, 2013, 15 pages.
Machine Translation and Abstract of Chinese Publication No. CN103152361, Jun. 12, 2013, 21 pages.
Machine Translation and Abstract of Chinese Publication No. CN104580168, Apr. 29, 2015, 28 pages.
Foreign Communication From A Counterpart Application, Chinese Application No. 201410810857.X, Chinese Office Action dated May 3, 2017, 5 pages.
Foreign Communication From A Counterpart Application, PCT Application No. PCT/CN2015/096509, English Translation of International Search Report dated Mar. 2, 2016, 2 pages.
Foreign Communication From A Counterpart Application, PCT Application No. PCT/CN2015/096509, English Translation of Written Opinion dated Mar. 2, 2016, 7 pages.
Hu, Y., et al., "Design of Event-Based Intrusion Detection System on OpenFlow Network," IEEE/IFIP International Conference on DSN, Jun. 27, 2013, 2 pages.
OpenFlow, "SDN Security Considerations in the Data Center," ONF Solution Brief, ONF, Oct. 8, 2013, 12 pages.
Foreign Communication From A Counterpart Application, Korean Application No. 10-2017-7020719, Korean Office Action dated Mar. 28, 2019, 8 pages.
Foreign Communication From A Counterpart Application, Korean Application No. 10-2017-7020719, English Translation of Korean Office Action dated Mar. 28, 2019, 7 pages.
Foreign Communication From A Counterpart Application, Japanese Application No. 2017-533598, Japanese Notice of Allowance dated Jan. 22, 2019, 2 pages.
Foreign Communication From A Counterpart Application, Japanese Application No. 2017-533598, English Translation of Japanese Notice of Allowance dated Jan. 22, 2019, 3 pages.
Machine Translation and Abstract of International Publication No. WO2014133025, Feb. 20, 2014, 31 pages.
Foreign Communication From A Counterpart Application, Japanese Application No. 2017-533598, Japanese Rejection dated Jun. 26, 2019, 2 pages.
Foreign Communication From A Counterpart Application, Japanese Application No. 2017-533598, English Translation of Japanese Rejection dated Jul. 2, 2019, 3 pages.

* cited by examiner

| Packet header field | Counter | Action | | | | | |
|---|---|---|---|---|---|---|---|
| Source MAC address | Destination MAC address | Source IP address | Destination IP address | Protocol number | Source port number | Destination port number | ... |

ATTACK DATA PACKET PROCESSING METHOD, APPARATUS, AND SYSTEM

CROSS-REFERENCE TO RELATED APPLICATIONS

This application is a continuation of International Application No. PCT/CN2015/096509, filed on Dec. 6, 2015, which claims priority to Chinese Patent Application No. 201410810857.X, filed on Dec. 22, 2014, both of which are hereby incorporated by reference in their entireties.

TECHNICAL FIELD

The present disclosure relates to the field of communications technologies, and in particular, to an attack data packet processing method, an apparatus, and a system.

BACKGROUND

With rapid development of cloud technologies, increasing quantities of problems arise in application of the cloud technologies. For example, a server in a cloud data center (a cloud server for short) may be attacked by various attack data packets during Internet Protocol (IP) communication, for example, by a distributed denial of service (DDoS) attack and a fraud message attack. Therefore, processing an attack data packet to ensure secure communication for the cloud server becomes one of core technologies of the cloud technologies.

Currently, a common attack data packet processing manner is as follows. By deploying a physical firewall on an entrance cloud server in a cloud data center or deploying a virtual firewall on a hypervisor running on each cloud server in a cloud data center, it is ensured that all data packets waiting to enter the cloud server undergo filtering and forwarding by the physical/virtual firewall; therefore, an attack data packet is filtered out, and the attack data packet is prevented from entering the cloud server, thereby ensuring that the cloud server can perform secure communication. According to a security policy configured for the physical/virtual firewall by working personnel, the physical/virtual firewall identifies IP layer signaling carried by a data packet that waits to enter an IP layer. When the IP layer signaling does not comply with the security policy, the physical/virtual firewall filters out the data packet, which prevents an attack data packet from attacking the cloud server, and further ensures that the cloud server can perform secure communication.

However, in the foregoing method for preventing, using a firewall, an attack data packet from entering a cloud server, only the firewall can be used to prevent the attack data packet from entering the cloud server, and a switch responsible for forwarding a data packet to the firewall may still forward the attack data packet to the firewall, that is, the attack data packet is still transmitted in a network. Therefore, the abnormal data packet occupies a large quantity of network bandwidth, and affects transmission of a normal data packet.

SUMMARY

The present disclosure provides an attack data packet processing method, an apparatus, and a system, which can limit network bandwidth occupied by an attack data packet when the attack data packet is transmitted in a network, and ensure transmission of a normal data packet.

To achieve the foregoing objective, the following technical solutions are used in the present disclosure.

According to a first aspect, the present disclosure provides an attack data packet processing method, including receiving, by a management node, description information of an attack data packet and an attack type of the attack data packet, where the description information and the attack type are sent by an awareness node; determining, by the management node, a processing policy on the attack data packet of the attack type according to the attack type, where the processing policy is used to instruct a switch to perform an operation indicated by the processing policy on the attack data packet with the description information; and sending, by the management node, the description information and the processing policy to the switch using a software-defined networking (SDN) controller, so that the switch performs the operation indicated by the processing policy on the attack data packet with the description information.

In a first possible implementation manner of the first aspect, determining, by the management node, a processing policy on the attack data packet of the attack type according to the attack type includes obtaining, by the management node, a preset processing policy on the attack data packet of the attack type according to the attack type.

With reference to the foregoing first aspect, in a second possible implementation manner of the first aspect, determining, by the management node, a processing policy on the attack data packet of the attack type according to the attack type includes generating, by the management node, a processing policy on the attack data packet of the attack type according to the attack type and a preset algorithm.

With reference to any one of the foregoing first aspect, or the first possible implementation manner of the first aspect and the second possible implementation manner of the first aspect, in a third possible implementation manner, the operation indicated by the processing policy includes a processing action on the attack data packet with the description information, or a processing action on the attack data packet with the description information and a time for performing the processing action.

With reference to any one of the foregoing first aspect, or the first possible implementation manner of the first aspect to the third possible implementation manner of the first aspect, in a fourth possible implementation manner, when the management node receives description information of multiple attack data packets and attack types of the multiple attack data packets, where the description information and the attack types are sent by multiple awareness nodes, the determining, by the management node, a processing policy on the attack data packet of the attack type according to the attack type includes determining, by the management node, at least two same attack types according to the attack types of the multiple attack data packets; and determining, by the management node according to one of the at least two attack types, a processing policy on the attack data packet of the attack type.

With reference to any one of the foregoing first aspect, or the first possible implementation manner of the first aspect to the fourth possible implementation manner of the first aspect, in a fifth possible implementation manner, the sending, by the management node, the description information and the processing policy to the switch using an SDN controller includes sending, by the management node, the description information and the processing policy to the SDN controller using a preset communications interface, so that the SDN controller forwards the description information and the processing policy to the switch.

With reference to any one of the foregoing first aspect, or the first possible implementation manner of the first aspect to the fifth possible implementation manner of the first aspect, in a sixth possible implementation manner, the description information includes a source IP address of the attack data packet, a source port number of the attack data packet, a destination IP address of the attack data packet, a destination port number of the attack data packet, and a protocol number of the attack data packet.

According to a second aspect, the present disclosure provides an attack data packet processing method, including receiving, by a SDN controller, description information of an attack data packet and a processing policy on the attack data packet with the description information, where the description information and the processing policy are sent by a management node; and sending, by the SDN controller, the description information and the processing policy to a first switch, so that the first switch performs an operation indicated by the processing policy on the attack data packet with the description information.

In a first possible implementation manner of the second aspect, the receiving, by an SDN controller, description information of an attack data packet and a processing policy on the attack data packet with the description information, where the description information and the processing policy are sent by a management node includes receiving, by the SDN controller using a preset communications interface, the description information and the processing policy that are sent by the management node. With reference to the foregoing second aspect or the first possible implementation manner of the second aspect, in a second possible implementation manner, after the receiving, by an SDN controller, description information of an attack data packet and a processing policy on the attack data packet with the description information, where the description information and the processing policy are sent by a management node, the method further includes sending, by the SDN controller, the description information and the processing policy to a master SDN controller connected to the SDN controller, so that the master SDN controller forwards the description information and the processing policy to a second switch, and the second switch performs the operation indicated by the processing policy on the attack data packet with the description information.

According to a third aspect, the present disclosure provides an attack data packet processing method, including identifying, by an awareness node, a data packet received by the awareness node as an attack data packet; determining, by the awareness node, description information of the attack data packet and an attack type of the attack data packet; and sending, by the awareness node, the description information and the attack type to a management node, where the attack type is used by the management node to determine a processing policy on the attack data packet of the attack type, and the processing policy is used to instruct a switch that forwards a data packet to perform an operation indicated by the processing policy on the attack data packet with the description information.

In a first possible implementation manner of the third aspect, the description information includes a source IP address of the attack data packet, a source port number of the attack data packet, a destination IP address of the attack data packet, a destination port number of the attack data packet, and a protocol number of the attack data packet.

According to a fourth aspect, the present disclosure provides a management node, including a receiving unit configured to receive description information of an attack data packet and an attack type of the attack data packet, where the description information and the attack type are sent by an awareness node; a determining unit configured to determine a processing policy on the attack data packet of the attack type according to the attack type received by the receiving unit, where the processing policy is used to instruct a switch to perform an operation indicated by the processing policy on the attack data packet with the description information; and a sending unit configured to send the description information received by the receiving unit and the processing policy determined by the determining unit to the switch using a SDN controller, so that the switch performs the operation indicated by the processing policy on the attack data packet with the description information.

In a first possible implementation manner of the fourth aspect, the determining unit is configured to obtain a preset processing policy on the attack data packet of the attack type according to the attack type received by the receiving unit.

With reference to the foregoing fourth aspect, in a second possible implementation manner, the determining unit is configured to generate a processing policy on the attack data packet of the attack type according to the attack type received by the receiving unit and a preset algorithm.

With reference to any one of the foregoing fourth aspect, or the first possible implementation manner of the fourth aspect and the second possible implementation manner of the fourth aspect, in a third possible implementation manner, the operation indicated by the processing policy determined by the determining unit includes a processing action on the attack data packet with the description information, or a processing action on the attack data packet with the description information and a time for performing the processing action.

With reference to any one of the foregoing fourth aspect, or the first possible implementation manner of the fourth aspect to the third possible implementation manner of the fourth aspect, in a fourth possible implementation manner, the determining unit is configured to, when the receiving unit receives description information of multiple attack data packets and attack types of the multiple attack data packets, where the description information and the attack types are sent by multiple awareness nodes, determine at least two same attack types according to the attack types of the multiple attack data packets, and determine, according to one of the at least two attack types, a processing policy on the attack data packet of the attack type.

With reference to any one of the foregoing fourth aspect, or the first possible implementation manner of the fourth aspect to the fourth possible implementation manner of the fourth aspect, in a fifth possible implementation manner, the sending unit is configured to send the description information received by the receiving unit and the processing policy determined by the determining unit to the SDN controller using a preset communications interface, so that the SDN controller forwards the description information and the processing policy to the switch.

With reference to any one of the foregoing fourth aspect, or the first possible implementation manner of the fourth aspect to the fifth possible implementation manner of the fourth aspect, in a sixth possible implementation manner, the description information received by the receiving unit includes a source IP address of the attack data packet, a source port number of the attack data packet, a destination IP address of the attack data packet, a destination port number of the attack data packet, and a protocol number of the attack data packet.

According to a fifth aspect, the present disclosure provides a SDN controller, including a receiving unit configured to receive description information of an attack data packet and a processing policy on the attack data packet with the description information, where the description information and the processing policy are sent by a management node; and a sending unit configured to send the description information and the processing policy that are received by the receiving unit to a first switch, so that the first switch performs an operation indicated by the processing policy on the attack data packet with the description information.

In a first possible implementation manner of the fifth aspect, the receiving unit is configured to receive, using a preset communications interface, the description information and the processing policy that are sent by the management node.

With reference to the foregoing fifth aspect or the first possible implementation manner of the fifth aspect, in a second possible implementation manner, the sending unit is further configured to send the description information and the processing policy that are received by the receiving unit to a master SDN controller, so that the master SDN controller forwards the description information and the processing policy to a second switch, and the second switch performs the operation indicated by the processing policy on the attack data packet with the description information.

According to a sixth aspect, the present disclosure provides an awareness node, including an identification unit configured to identify a received data packet as an attack data packet; a determining unit configured to determine description information of the attack data packet identified by the identification unit and an attack type of the attack data packet; and a sending unit configured to send the description information and the attack type that are determined by the determining unit to a management node, where the attack type is used by the management node to determine a processing policy on the attack data packet of the attack type, and the processing policy is used to instruct a switch that forwards a data packet to perform an operation indicated by the processing policy on the attack data packet with the description information.

In a first possible implementation manner of the sixth aspect, the description information determined by the determining unit includes a source IP address of the attack data packet, a source port number of the attack data packet, a destination IP address of the attack data packet, a destination port number of the attack data packet, and a protocol number of the attack data packet.

According to a seventh aspect, the present disclosure provides a communications system, including the management node according to the foregoing fourth aspect or any possible implementation manner of the fourth aspect, the SDN controller according to the foregoing fifth aspect or any possible implementation manner of the fifth aspect, the awareness node according to the foregoing sixth aspect or the first possible implementation manner of the sixth aspect, and a switch.

The present disclosure provides the attack data packet processing method, the apparatus, and the system, where the method comprises receiving, by a management node, description information of an attack data packet and an attack type of the attack data packet, where the description information and the attack type are sent by an awareness node; determining a processing policy on the attack data packet of the attack type according to the attack type; and sending the description information and the processing policy to a switch using an SDN controller, so that the switch performs an operation indicated by the processing policy on the attack data packet with the description information, where the processing policy is used to instruct the switch to perform the operation indicated by the processing policy on the attack data packet with the description information. According to the attack data packet processing method, the apparatus, and the system provided in the present disclosure, after the awareness node identifies a data packet received by the awareness node as the attack data packet and sends the description information of the attack data packet and the attack type of the attack data packet to the management node, the management node can determine the processing policy on the attack data packet of the attack type according to the attack type and send the description information and the processing policy to the switch using the SDN controller, so that the switch performs the operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description are merely some but not all of the accompanying drawings of the embodiments of the present disclosure.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

In the embodiments of the present disclosure, an awareness node may be any cloud server that is in a cloud data center and can identify an attack data packet, for example, various service processing virtual machines (VM), a hypervisor, a firewall, a load balancer, or a gateway. A management node may be any service management node or policy management node in a cloud data center, for example, a VM manager, a virtualized infrastructure manager (VIM), or a policy and charging rules function (PCRF) unit.

An attack data packet processing method provided in the embodiments of the present disclosure may be applied to a network architecture that is based on a SDN technology. The network architecture that is based on the SDN technology is a directly programmable network architecture that decouples controlling from forwarding. In the network architecture that is based on the SDN technology, a specific forwarding path and a forwarding policy of each data packet in a network are both controlled by an SDN controller, the SDN controller sends the forwarding path and the forwarding policy of the data packet to a switch cluster in the SDN architecture using an OpenFlow® protocol, and a switch in the switch cluster forwards the data packet to a cloud server in a cloud data center. The switch in the network architecture that is based on the SDN technology is only responsible for forwarding the data packet according to the forwarding policy and the forwarding path of the data packet.

Figure 1:
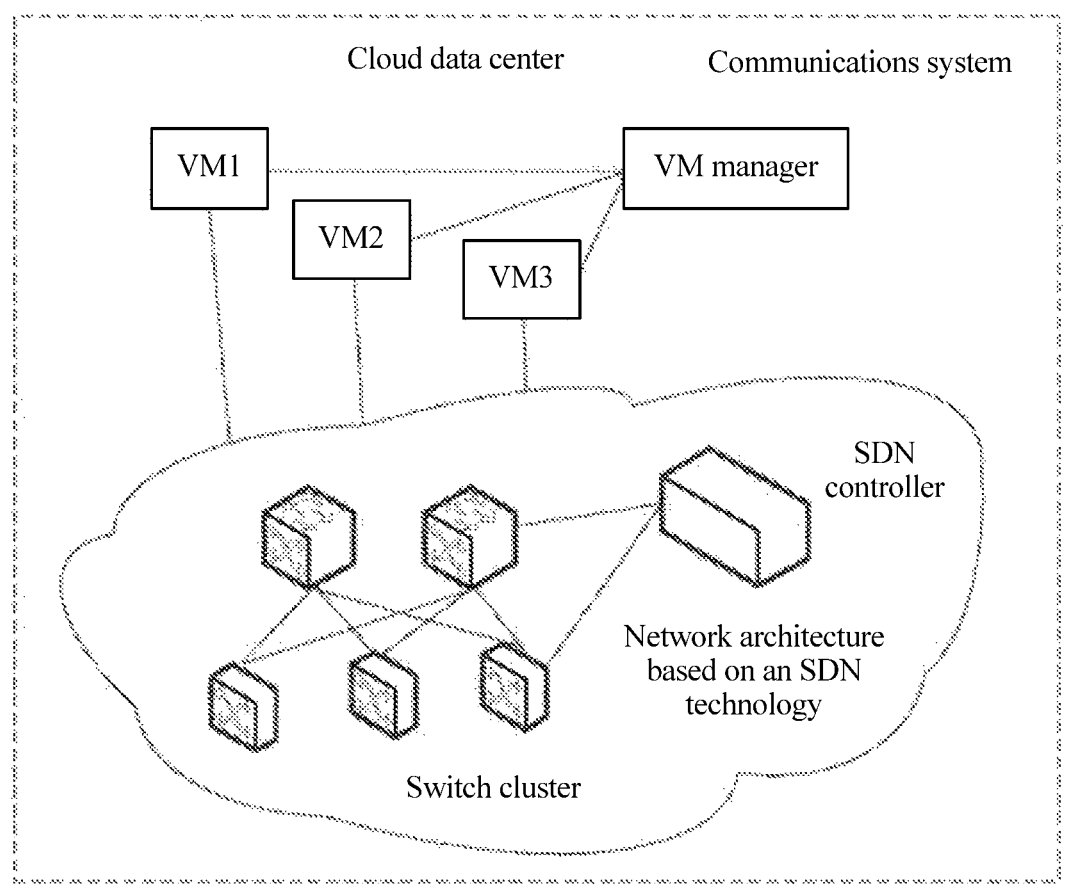
FIG. 1 is a block diagram 1 of a communications system according to an embodiment of the present disclosure.

Exemplarily, FIG. 1 shows a block diagram of a communications system according to an embodiment of the present disclosure. As shown in FIG. 1, a data center has three VMs and one VM manager. In the network architecture that is based on the SDN technology, for both data packet transmission performed between the three VMs in the data center and a server outside the data center and data packet transmission performed between the three VMs, a forwarding path and a forwarding policy of a data packet are controlled by an SDN controller, and a switch implements forwarding of the data packet.

The embodiments of the present disclosure provide an attack data packet processing method. By controlling a switch to process an attack data packet, forwarding of the attack data packet by the switch can be limited, and therefore network bandwidth occupied by the attack data packet when the attack data packet is transmitted in a network is limited, thereby ensuring transmission of a normal data packet, and further ensuring that a cloud server in a cloud data center can perform secure communication.

Embodiment 1

Figure 2:
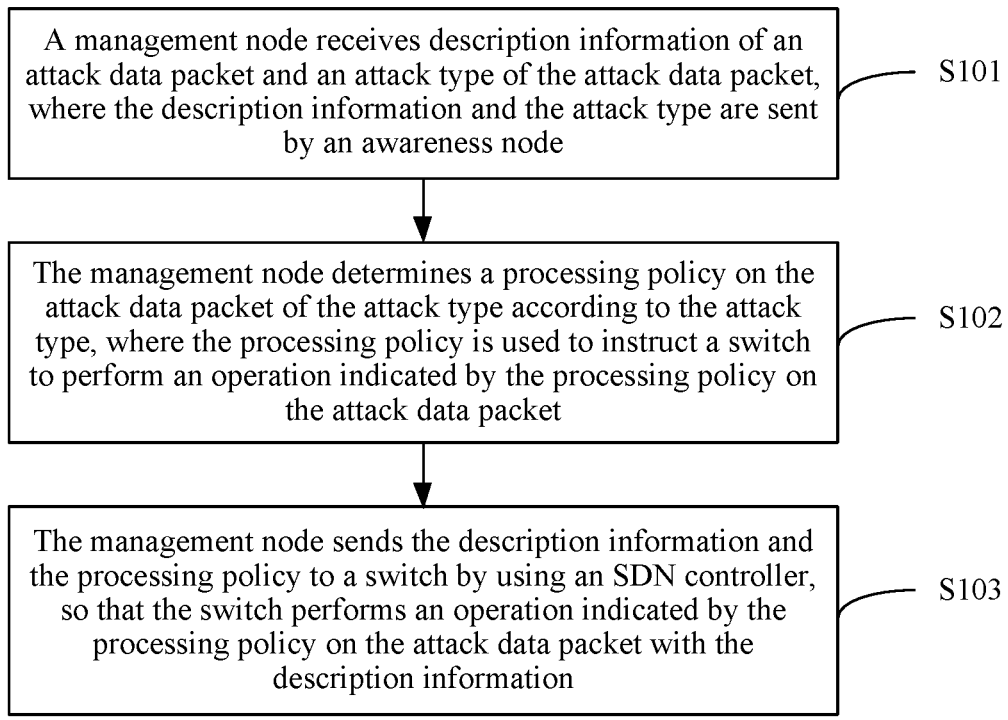
FIG. 2 is a flowchart 1 of an attack data packet processing method according to an embodiment of the present disclosure.

An embodiment of the present disclosure provides an attack data packet processing method. As shown in FIG. 2, the method may include the following steps.

S101. A management node receives description information of an attack data packet and an attack type of the attack data packet, where the description information and the attack type are sent by an awareness node.

The attack data packet may be understood as a data packet posing a threat to the awareness node, for example, a data packet with a malformed packet, a data packet with a packet fragmentation exception, a data packet using an invalid Transmission Control Protocol (TCP) connection, and a data packet with an extra large data volume.

Optionally, the description information of the attack data packet may be information obtained by the awareness node from a packet header of the attack data packet, and may be a source IP address of the attack data packet, a destination IP address of the attack data packet, a source port number of the attack data packet, a destination port number of the attack data packet, and a protocol number of the attack data packet. The source port number of the attack data packet may be a user datagram protocol (UDP) source port number, and the destination port number of the attack data packet may be a UDP destination port number; or the source port number of the attack data packet may be a TCP source port number, and the destination port number of the attack data packet may be a TCP destination port number. Using the description information, a switch can process the attack data packet with the description information.

The attack type of the attack data packet may include but is not limited to a DDoS attack, a Session Initiation Protocol (SIP) based attack, an invalid TCP connection, an extra large data volume, a fraud message attack, and the like.

S102. The management node determines a processing policy on the attack data packet of the attack type according to the attack type, where the processing policy is used to instruct a switch to perform an operation indicated by the processing policy on the attack data packet with the description information.

The processing policy may include a processing action on the attack data packet, for example, drop, committed access rate (CAR), or redirect. Alternatively, the processing policy may include a processing action on the attack data packet and a time for performing the processing action. The time for performing the processing action may be immediately performing the processing action, performing the processing action after a delay, performing the processing action in duration, or the like.

Further, in this embodiment of the present disclosure, there are multiple manners in which the management node determines the processing policy on the attack data packet of the attack type according to the attack type. That the management node determines the processing policy on the attack data packet of the attack type according to the attack type is exemplarily described using the following two possible implementation manners (Manner 1 and Manner 2). All other manners in which the management node determines the processing policy on the attack data packet of the attack type according to the attack type shall fall within the protection scope of the present disclosure, which is not limited in the present disclosure.

Manner 1: In this embodiment of the present disclosure, the management node may obtain a preset processing policy on the attack data packet of the attack type according to the attack type. A mapping relationship between an attack type and a processing policy may be preset in the management node. When receiving an attack type, the management node may determine, from the preset mapping relationship according to the attack type, a processing policy corresponding to the attack type, that is, the processing policy on the attack data packet of the attack type is determined.

For example, it is assumed that the mapping relationship, preset in the management node, between an attack type and a processing policy may be shown in Table 1. The processing policy in Table 1 includes a processing action on an attack data packet. "Car+1 Mbps" indicates performing a committed access rate operation on an attack data packet with an extra large data volume, so that maximum bandwidth used by the data packet after the committed access rate operation is 1 Mbps. "Redirect+null0" indicates performing a redirect operation on an attack data packet of a SIP based attack type, so that the attack data packet is forwarded to a null0 interface, where the null0 interface indicates a routing black hole interface, all data packets forwarded to the null0 interface are dropped, and forwarding the attack data packet to the null0 interface has little impact on network load. For example, when the attack type received by the management node is the DDoS attack, a processing policy on an attack data packet of a DDoS attack type may be determined as "drop" according to Table 1.

TABLE 1

| Attack type | Processing policy |
|---|---|
| DDoS attack | Drop |
| Extra large data volume | Car + 1 Mbps |
| SIP based attack | Redirect + null0 |

Optionally, the processing policy in the foregoing Table 1 may include a processing action and a time for performing the processing action. For example, a processing policy corresponding to the DDoS attack may be preset to "Drop+immediately", which indicates immediately performing a drop operation on an attack data packet of the DDoS attack type; and a processing policy corresponding to the SIP based attack may be "Redirect+null0+immediately+duration180", which indicates immediately performing a redirect operation on an attack data packet of the SIP based attack type, so that the attack data packet is immediately forwarded to the null0 interface, and forwarding is continuously performed for 180 minutes.

It should be noted that in a specific implementation process, a proper mapping relationship between an attack type and a processing policy may be set in the management node according to an actual engineering requirement, which is not limited in the present disclosure.

Manner 2: The management node generates a processing policy on the attack data packet of the attack type according to the attack type and a preset algorithm. An algorithm may be preset in the management node. When receiving an attack type, the management node generates the processing policy on the attack data packet of the attack type by performing the preset algorithm procedure for the attack type.

Exemplarily, when the attack type received by the management node is the DDoS attack, the management node computes code of the attack type using the preset algorithm, and generates a processing policy "drop" on the attack data packet of the attack type; or when the attack type received by the management node is the SIP based attack, the management node computes code of the attack type using the preset algorithm, and generates a processing policy "Redirect+null0" on the attack data packet of the attack type.

It should be noted that in a specific implementation process, a proper algorithm may be set in the management node according to an actual engineering requirement, which is not limited in the present disclosure.

S103. The management node sends the description information and the processing policy to a switch using an SDN controller, so that the switch performs an operation indicated by the processing policy on the attack data packet with the description information.

Exemplarily, it is assumed that the description information, received by the management node, of the attack data packet is "[10.11.100.100,10.22.200.200,6,1234,4321]", where 10.11.100.100 indicates a source IP address of the attack data packet, 10.22.200.200 indicates a destination IP address of the attack data packet, 1234 indicates a source port number of the attack data packet, 4321 indicates a destination port number of the attack data packet, and a protocol number of the attack data packet is 6. The attack type, received by the management node, of the attack data packet is the DDoS attack, and a processing policy that is on the attack data packet and is determined according to the attack type is "Drop+immediately", The management node may send the description information and the processing policy to the SDN controller in a "[10.11.100.100, 10.22.200.200,6,1234,4321]+Drop+immediately" format. The SDN controller forwards the received "[10.11.100.100, 10.22.200.200,6,1234,4321]+Drop+immediately" to the switch in a format specified by an Open Flow protocol.

After receiving the description information and the processing policy, the switch immediately drops attack data with the description information according to the processing policy. In this way, the switch no longer forwards the attack data packet, so that the attack data packet is not transmitted in a network, that is, the attack data packet with the description information does not occupy network bandwidth, thereby ensuring transmission of a normal data packet.

It may be understood that if the processing policy that is on the attack data packet and is determined by the management node according to the attack type is "Car+1 Mbps", after the management node sends the description information and the processing policy to the switch using the SDN controller, the switch performs a committed access rate operation on the attack data packet with the description information, so that when being transmitted in a network, the attack data packet with the description information occupies a maximum of 1 megabits per second (Mbps) bandwidth. That is, even though the switch still forwards the attack data packet, the attack data packet occupies a maximum of 1 Mbps bandwidth when being transmitted in the network. Therefore, network bandwidth occupied by the attack data packet with the description information when the attack data packet with the description information is transmitted in a network is limited, and transmission of a normal data packet is ensured.

Further, a process in which the switch performs the operation indicated by the processing policy on the attack data packet with the description information is described in detail in the following embodiment, and details are not further described herein.

This embodiment of the present disclosure provides an attack data packet processing method, which comprises receiving, by a management node, description information of an attack data packet and an attack type of the attack data packet, where the description information and the attack type are sent by an awareness node; determining a processing policy on the attack data packet of the attack type according to the attack type; and sending the description information and the processing policy to a switch using an SDN controller, so that the switch performs an operation indicated by the processing policy on the attack data packet with the description information, where the processing policy is used to instruct the switch to perform the operation indicated by the processing policy on the attack data packet with the description information. According to the method, after the awareness node identifies a data packet received by the awareness node as the attack data packet and sends the description information of the attack data packet and the attack type of the attack data packet to the management node, the management node can determine the processing policy on the attack data packet of the attack type according to the attack type and send the description information and the processing policy to the switch using the SDN controller, so that the switch performs the operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Figure 3:
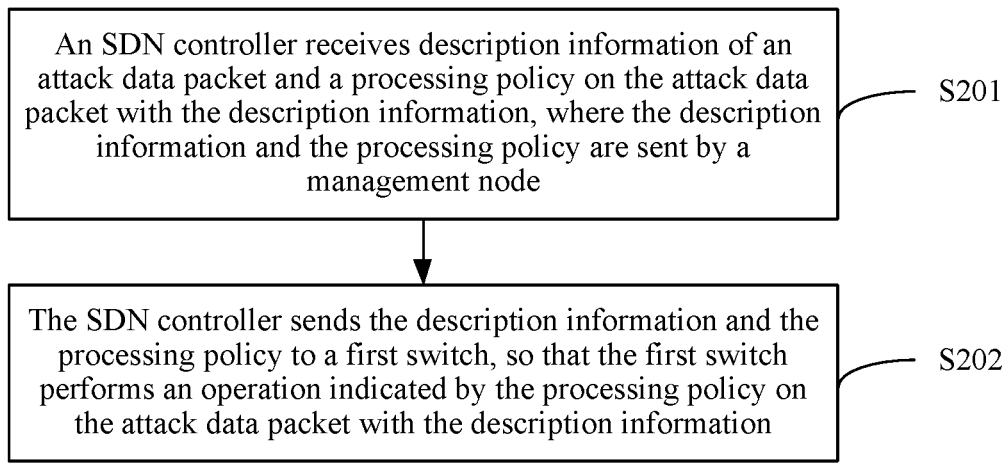
FIG. 3 is a flowchart 2 of an attack data packet processing method according to an embodiment of the present disclosure.

An embodiment of the present disclosure provides an attack data packet processing method. As shown in FIG. 3, the method may include the following steps.

S201. An SDN controller receives description information of an attack data packet and a processing policy on the attack data packet with the description information, where the description information and the processing policy are sent by a management node.

For the description information of the attack data packet and the processing policy on the attack data packet with the description information, reference may be made to a related description in the embodiment shown in FIG. 2, and details are not further described herein.

S202. The SDN controller sends the description information and the processing policy to a first switch, so that the first switch performs an operation indicated by the processing policy on the attack data packet with the description information.

The first switch is any switch in a switch cluster controlled by the SDN controller.

The SDN controller may convert the description information and the processing policy into a controller-to-switch message and send the controller-to-switch message to the first switch. The controller-to-switch message is a type of message that is specified by a Open Flow protocol, and is sent by the SDN controller to the switch to instruct the switch to modify or drop information recorded in a flow table of the switch.

After the SDN controller converts the description information and the processing policy into the controller-to-switch message and sends the controller-to-switch message to the first switch, the first switch searches, according to the description information included in the controller-to-switch message, a flow table of the first switch for an attack data flow matching the description information, and then performs the operation indicated by the processing policy on an attack data packet in the attack data flow according to the processing policy included in the controller-to-switch message, that is, the SDN controller performs the operation indicated by the processing policy on the attack data packet with the description information according to the processing policy.

Figures 4, 5:
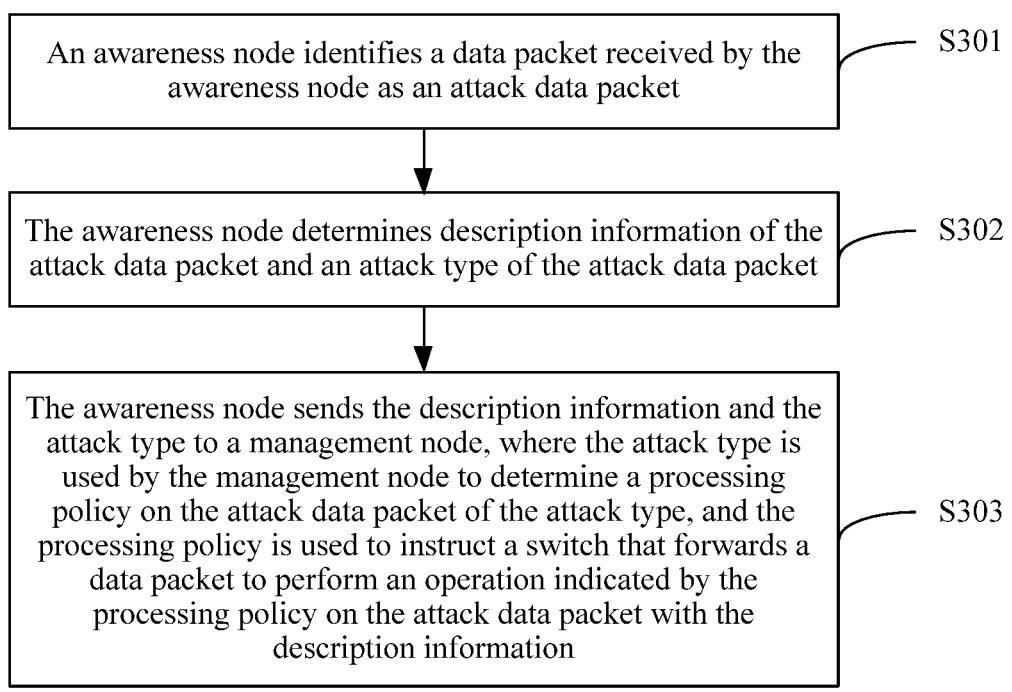
FIG. 4 is a schematic diagram of a flow table of a first switch according to an embodiment of the present disclosure.
FIG. 5 is a flowchart 3 of an attack data packet processing method according to an embodiment of the present disclosure.

FIG. 4 shows a schematic diagram of a flow table of a first switch according to an embodiment of the present disclosure. In FIG. 4, the flow table of the first switch includes a packet header field, a counter and an action performed on a data packet. The packet header field may include a source IP address, a destination IP address, a source media access control (MAC) address, a destination MAC address, a protocol number, a source port number, a destination port number, and the like that are of the data flow received by the first switch. The counter is configured to collect statistics about a quantity of data packets, a quantity of bytes, transmission duration, and the like that are of the data flow received by the first switch. The action performed on the data packet may include forwarding the data packet, dropping the data packet, modifying information in a packet header of a data packet in the flow table, and the like.

Exemplarily, assuming that the description information and the processing policy that are received by the SDN controller are "[10.11.100.100,10.22.200.200,6,1234, 4321]+Drop+immediately", after the SDN controller sends the "[10.11.100.100,10.22.200.200,6,1234,4321]+Drop+ immediately" to the first switch in a format specified by an Open Flow protocol, the first switch searches the flow table of the first switch for an attack data flow whose source IP address is 10.11.100.100, destination IP address is 10.22.200.200, source port number is 1234, destination port number is 4321, and protocol number is 6. After the first switch finds the attack data flow, according to the processing policy, an action performed on an attack data packet of the attack data flow is dropping immediately. That is, the first switch performs the operation of dropping immediately on an attack data packet with the description information "[10.11.100.100,10.22.200.200,6,1234,4321]".

It should be noted that each data flow stored in the flow table of the first switch has unique description information and an action performed on a data packet in each data flow. After transmission of all data packets in a data flow is completed, the flow table deletes a record of the data flow. Therefore, in the attack data packet processing method provided in this embodiment of the present disclosure, a first switch can search, according to description information and a processing policy that are sent by an SDN controller, a flow table for an attack data flow with the description information, and change an action performed on an attack data packet in the attack data flow into an operation indicated by the processing policy, so as to perform the operation indicated by the processing policy on an attack data packet that is not transmitted in attack data packets in the attack data flow. Further, an awareness node in a cloud data center avoids being continuously attacked by the attack data packet in the attack data flow.

This embodiment of the present disclosure provides an attack data packet processing method, which comprises receiving, by an SDN controller, description information of an attack data packet and a processing policy on the attack data packet with the description information, where the description information and the processing policy are sent by a management node; and sending the description information and the processing policy to a first switch, so that the first switch performs an operation indicated by the processing policy on the attack data packet with the description information. According to the method, after an awareness node identifies a data packet received by the awareness node as an attack data packet and sends description information of the attack data packet and an attack type of the attack data packet to a management node, the management node determines a processing policy on the attack data packet of the attack type according to the attack type and sends the description information and the processing policy to a switch using an SDN controller, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that a cloud server in the cloud data center can perform secure communication.

An embodiment of the present disclosure provides an attack data packet processing method. As shown in FIG. 5, the method may include the following steps.

S301. An awareness node identifies a data packet received by the awareness node as an attack data packet.

There are multiple manners in which the awareness node identifies the data packet received by the awareness node as the attack data packet, and a method for identifying, by the awareness node, the attack data packet is exemplarily described using the following three examples.

Example 1: After receiving a data packet, the awareness node identifies a packet of the data packet received by the awareness node, and if the awareness node determines that a source IP address and a destination IP address that are of the data packet are the same, the awareness node determines that the packet of the data packet is a malformed packet, and determines that the data packet is an attack data packet.

Example 2: After the awareness node receives a data packet, if the awareness node determines within a preset time that a packet traffic volume of the data packet received by the awareness node exceeds a preset threshold, the awareness node determines that the data packet is an attack data packet.

Example 3: After receiving a data packet, the awareness node identifies SIP signaling in the data packet and determines whether a SIP session process of the data packet is the same as a SIP session process in a known standard. If the awareness node determines that the SIP session process of the data packet is different from the SIP session process in the known standard, the awareness node determines that the data packet is an attack data packet.

Further, other manners in which an awareness node identifies a data packet received by the awareness node as an attack data packet are the same as manners in the prior art in which the awareness node identifies a data packet received by the awareness node as an attack data packet, and are not listed one by one herein.

It should be noted that in this embodiment of the present disclosure, an awareness node may be any service node that is in a cloud data center and can identify an attack data packet, for example, a VM, a hypervisor, a firewall, a load balancer, or a gateway. Therefore, compared with the prior art in which an attack data packet is identified by identifying IP layer signaling using a firewall, this embodiment of the present disclosure provides the attack data packet processing method in which an awareness node can not only identify an attack data packet by identifying IP layer signaling (for example, identify an attack data packet by identifying a malformed packet), but also identify an attack data packet by identifying service layer signaling (for example, identify an attack data packet of a SIP based attack type by identifying SIP signaling). In this way, accuracy of identifying the attack data packet is improved, and further an attack of the attack data packet to the awareness node is more comprehensively prevented.

S302. The awareness node determines description information of the attack data packet and an attack type of the attack data packet.

Exemplarily, if the awareness node identifies that the packet of the data packet received by the awareness node is the malformed packet, and because a malformed packet attack belongs to a type of DDoS attack, the awareness node may determine that the attack type of the attack data packet is the DDoS attack; or if the awareness node identifies, by identifying SIP information, the data packet received by the awareness node as the attack data packet, the awareness node may determine that an attack type of the data packet is a SIP based attack; or if the awareness node determines that a packet traffic volume of the data packet received by the awareness node exceeds a preset threshold, the awareness node identifies the data packet as the attack data packet, so that the awareness node may determine that the attack type of the data packet is a large data volume attack.

Further, after the awareness node determines that the data packet received by the awareness node is the attack data packet, the awareness node obtains the description information of the attack data packet from the attack data packet. Optionally, the description information of the attack data packet may be a source IP address of the attack data packet, a destination IP address of the attack data packet, a source port number of the attack data packet, a destination port number of the attack data packet, and a protocol number of the attack data packet.

S303. The awareness node sends the description information and the attack type to a management node, where the attack type is used by the management node to determine a processing policy on the attack data packet of the attack type, and the processing policy is used to instruct a switch that forwards a data packet to perform an operation indicated by the processing policy on the attack data packet with the description information.

For a process in which the management node determines the processing policy on the attack data packet of the attack type, reference may be made to a related description in the embodiment shown in FIG. 2; for a process in which the switch performs the operation indicated by the processing policy on the attack data packet with the description information according to the processing policy, reference may be made to a related description in the embodiment shown in FIG. 3, and details are not further described herein.

This embodiment of the present disclosure provides an attack data packet processing method, which comprises identifying, by an awareness node, a data packet received by the awareness node as an attack data packet; determining description information of the attack data packet and an attack type of the attack data packet; and sending the description information and the attack type to a management node, where the attack type is used by the management node to determine a processing policy on the attack data packet of the attack type, and the processing policy is used to instruct a switch that forwards a data packet to perform an operation indicated by the processing policy on the attack data packet with the description information. According to the method, after the awareness node identifies the data packet received by the awareness node as the attack data packet and sends the description information of the attack data packet and the attack type of the attack data packet with the description information to the management node, the management node determines the processing policy on the attack data packet of the attack type according to the attack type and sends the description information and the processing policy to the switch using an SDN controller, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; a problem in the prior art that the attack data packet occupies a large quantity of network bandwidth and affects transmission of a normal data packet is resolved; further, an awareness node in a cloud data center avoids being continuously attacked by the attack data packet with the description information, thereby ensuring that the awareness node in the cloud data center can perform secure communication.

Embodiment 2

Figure 6:
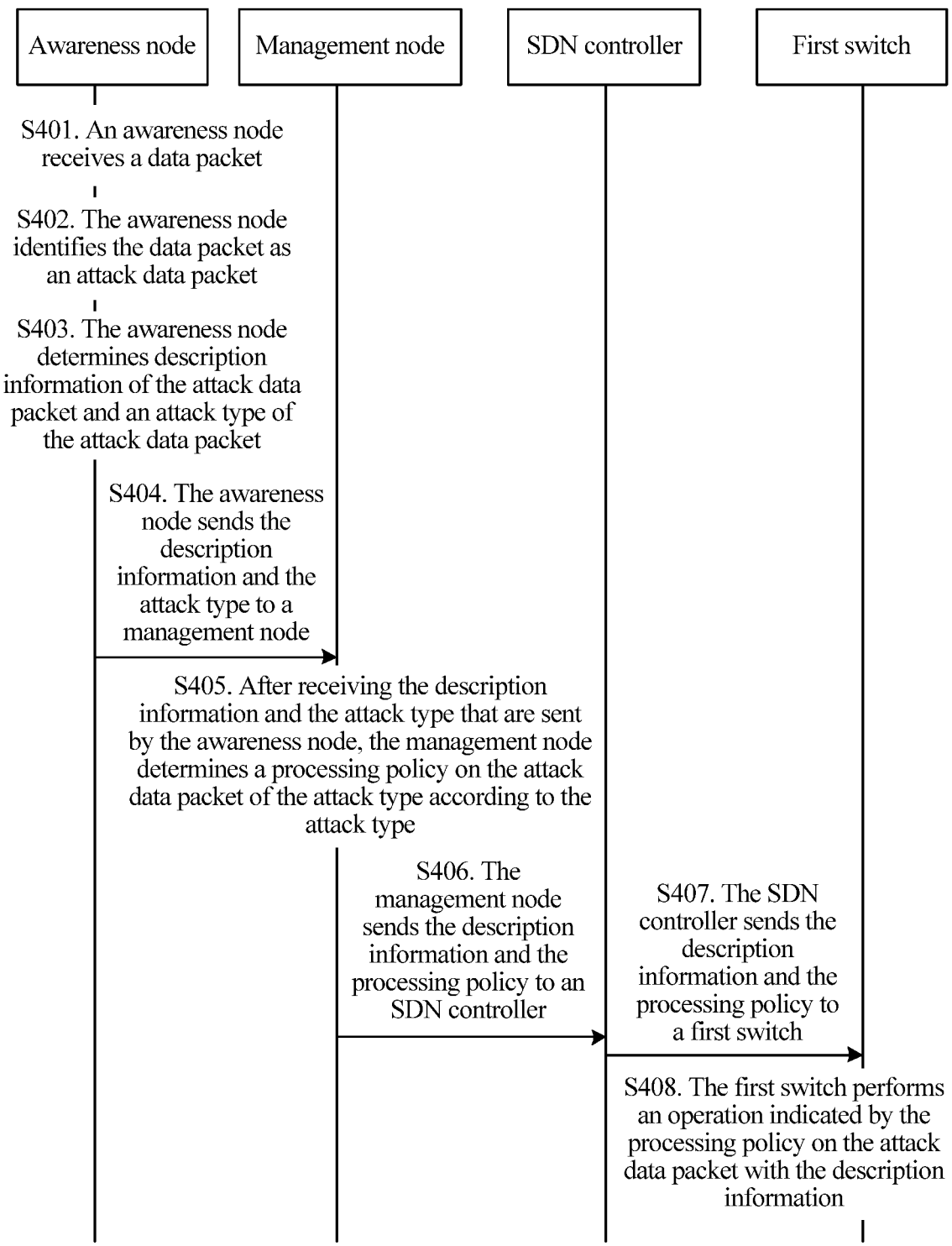
FIG. 6 is an interaction diagram 1 of an attack data packet processing method according to an embodiment of the present disclosure.

An embodiment of the present disclosure provides an attack data packet processing method. As shown in FIG. 6, the method may include the following steps.

S401. An awareness node receives a data packet.

S402. The awareness node identifies the data packet as an attack data packet.

S403. The awareness node determines description information of the attack data packet and an attack type of the attack data packet.

S404. The awareness node sends the description information and the attack type to a management node.

For a specific implementation manner of the foregoing steps S401 to S404, reference may be made to a related description in the embodiment shown in FIG. 5, and details are not further described herein.

S405. After receiving the description information and the attack type that are sent by the awareness node, the management node determines a processing policy on the attack data packet of the attack type according to the attack type.

S406. The management node sends the description information and the processing policy to an SDN controller.

It should be noted that in this embodiment of the present disclosure, a communications interface is preset on the management node, and the communications interface is used by the management node to send the description information and the attack type to the SDN controller. In addition, a communications interface is preset on the SDN controller and is used by the SDN controller to receive the description information and the attack type that are sent by the management node.

If the management node and the SDN controller perform information interaction using a UDP protocol, the communications interface separately on the management node and the SDN controller may be set based on the UDP protocol. When sending the description information and the attack type to the SDN controller, the management node does not need to establish a communication link with the SDN controller, and may directly send the description information and the attack type to the SDN controller using an address of the communications interface preset on the management node and an address of the communications interface preset on the SDN controller.

If the management node and the SDN controller perform information interaction using a TCP protocol, the communications interface separately on the management node and the SDN controller may be set based on the TCP protocol. When the management node sends the description information and the attack type to the SDN controller, a TCP connection needs to be established between the management node and the SDN controller to establish a communication link between two preset communications interfaces, and the management node sends the description information and the attack type to the SDN controller using the communication link.

S407. The SDN controller sends the description information and the processing policy to a first switch.

S408. The first switch performs an operation indicated by the processing policy on the attack data packet with the description information.

For a specific implementation manner of the foregoing steps S407 to S408, reference may be made to a related description in the embodiment shown in FIG. 3, and details are not further described herein.

Figure 7:
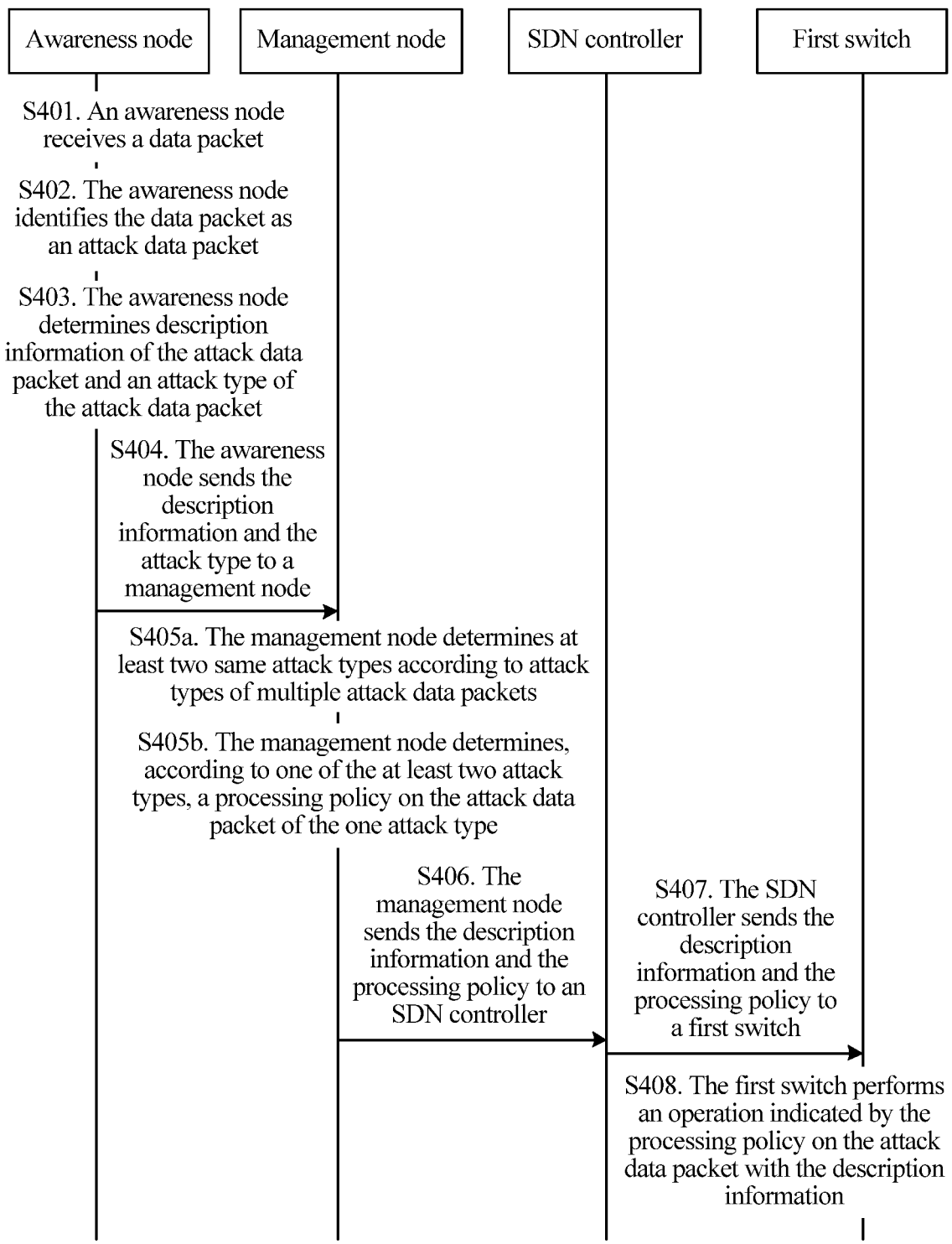
FIG. 7 is an interaction diagram 2 of an attack data packet processing method according to an embodiment of the present disclosure.

Optionally, in the foregoing step S405, if the management node receives description information of multiple attack data packets and attack types of the multiple attack data packets, where the description information and the attack types are sent by multiple awareness nodes, with reference to FIG. 6, as shown in FIG. 7, the foregoing step S405 may include the following steps.

S405a. The management node determines at least two same attack types according to the attack types of the multiple attack data packets.

S405b. The management node determines, according to one of the at least two attack types, a processing policy on the attack data packet of the attack type.

If the management node receives the description information of the multiple attack data packets and the attack types of the multiple attack data packets, where the description information and the attack types are sent by multiple awareness nodes, the management node determines, according to the attack types of the multiple attack data packets, whether at least two same attack types exist in the attack types of the multiple attack data packets. If the management node determines that the at least two same attack types exist in the attack types of the multiple attack data packets, the management node determines, according to one of the at least two attack types, a processing policy on the attack data packet of the attack type. That is, because the at least two attack types are the same, the management node determines, according to any one of the at least two attack types, a processing policy on the attack data packet of the attack type.

Further, the management node sends the processing policy with description information of each one of at least two attack data packets to the SDN controller, that is, a processing policy corresponding to description information of each one of the at least two attack data packet of the same attack type is the processing policy.

Figure 8A:
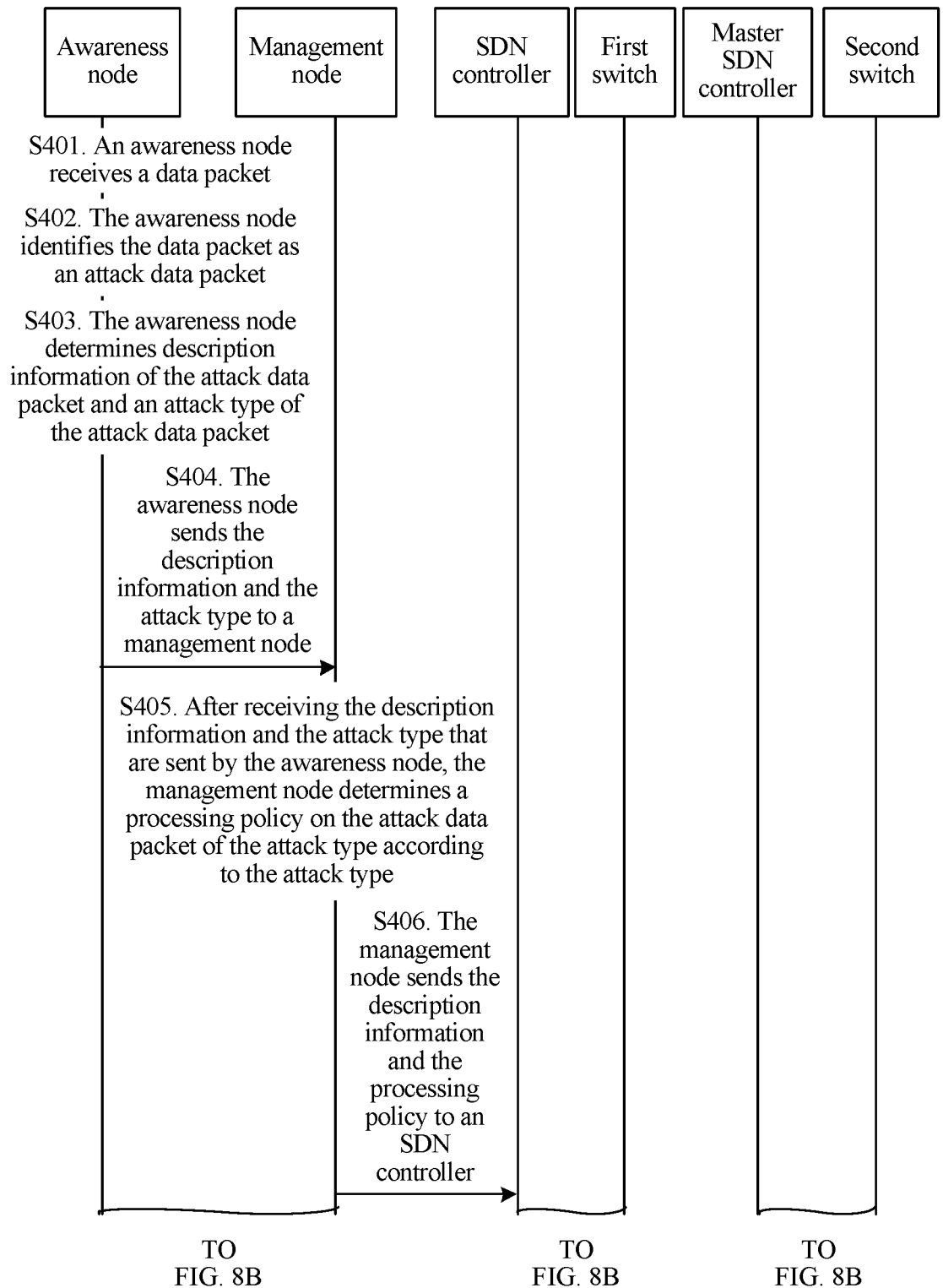
FIG. 8A and FIG. 8B are an interaction diagram 3 of an attack data packet processing method according to an embodiment of the present disclosure.
Figure 8B:
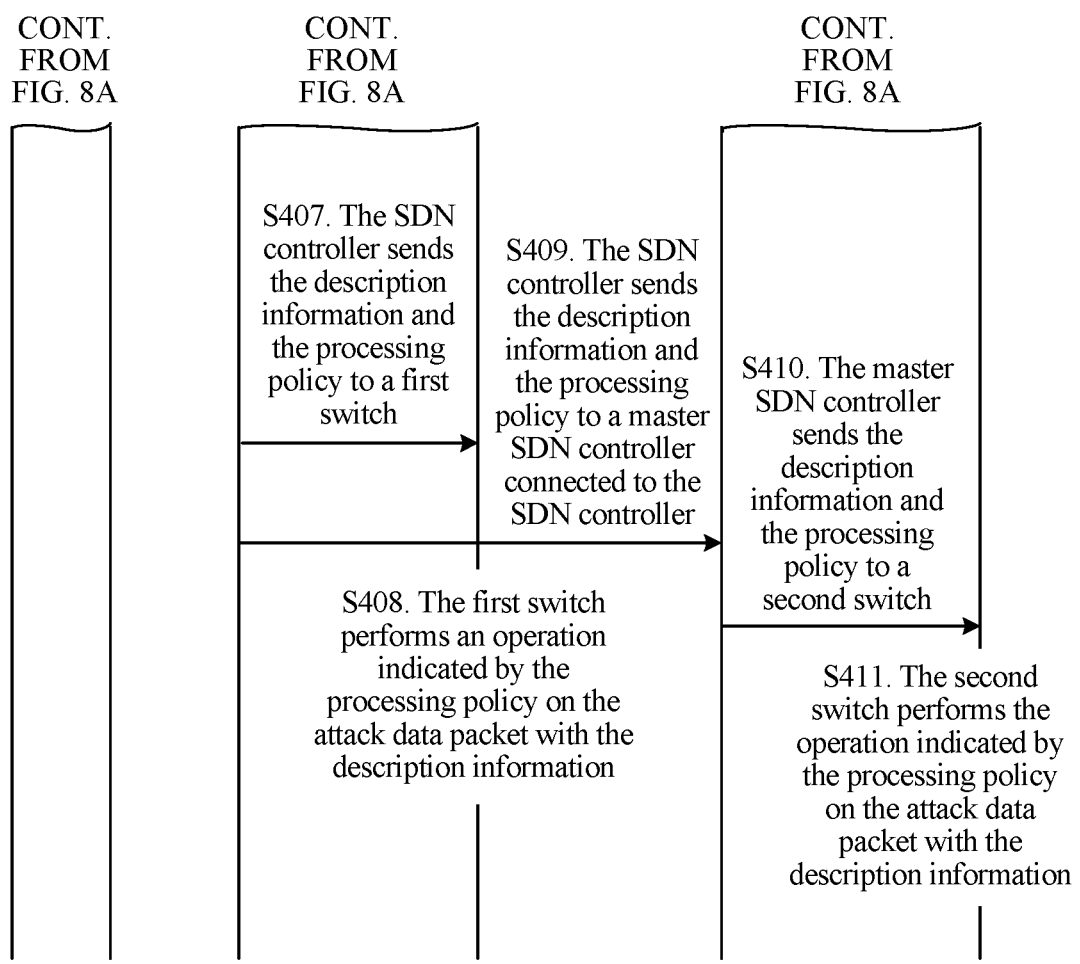

Further, after the foregoing step S406, with reference to FIG. 6, as shown in FIG. 8A and FIG. 8B, the method further includes the following steps.

S409. The SDN controller sends the description information and the processing policy to a master SDN controller connected to the SDN controller.

S410. The master SDN controller sends the description information and the processing policy to a second switch.

S411. The second switch performs the operation indicated by the processing policy on the attack data packet with the description information.

It should be noted that a sequence for the foregoing steps S407 and S409 is not limited in this embodiment of the present disclosure.

If both an internal network and an external network of a data center use a network architecture that is based on an SDN technology, after an SDN controller inside the data center receives the description information and the processing policy that are sent by the management node, the SDN controller directly forwards the description information and the processing policy to a master SDN controller. The master SDN controller is an SDN controller that is outside the data center and is connected to the SDN controller, that is, the master SDN controller is an SDN controller that is in a backbone network and is connected to the data center. The master SDN controller sends the description information and the processing policy to the second switch in a format specified by an OpenFlow protocol. The second switch is any switch in a switch cluster controlled by the master SDN controller. After receiving the description information and the processing policy, the second switch performs the operation indicated by the processing policy on the data packet with the description information, so that network bandwidth occupied by the attack data packet when the attack data packet is transmitted is limited in an entire network, and transmission of a normal data packet is ensured.

For a specific process in which the second switch performs the operation indicated by the processing policy on the attack data packet, reference may be made to a specific process, in the embodiment shown in FIG. 3, in which the first switch performs the operation indicated by the processing policy on the attack data packet, and details are not further described herein.

Figure 9:
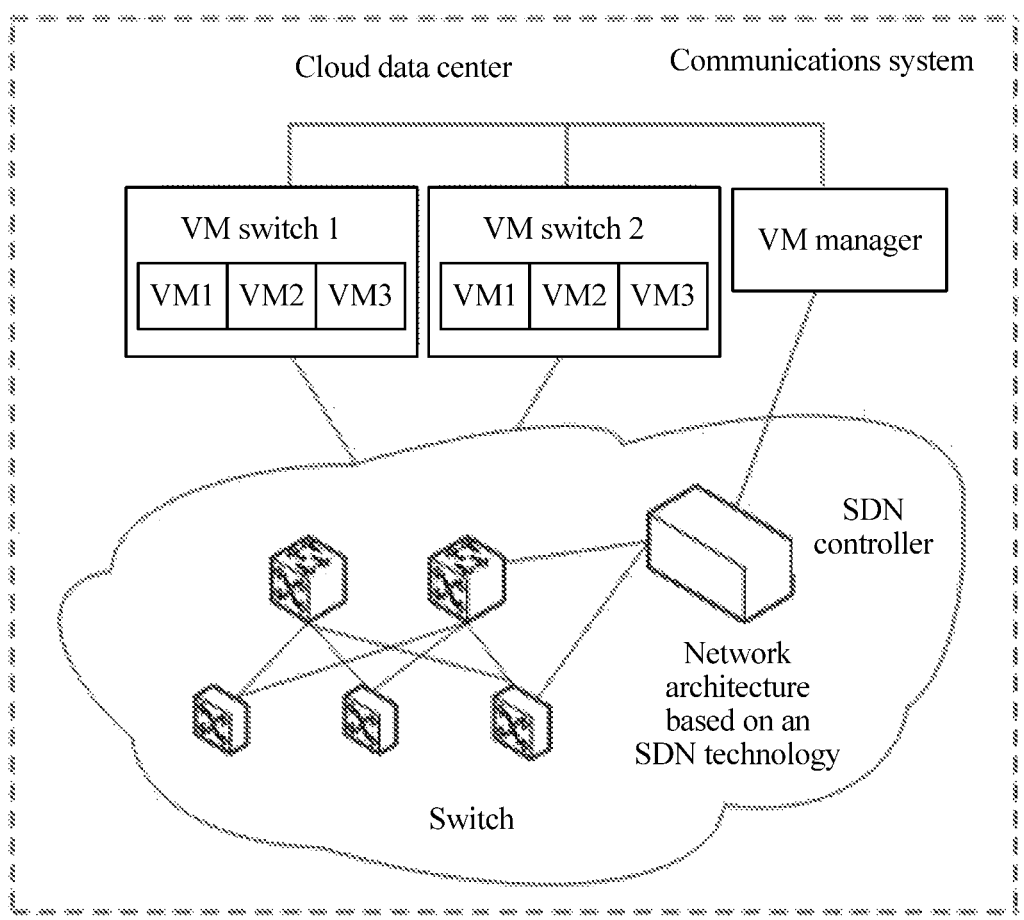
FIG. 9 is a block diagram 2 of a communications system according to an embodiment of the present disclosure.

Further, the following lists two possible application scenarios to exemplarily describe the attack data packet processing method provided in this embodiment of the present disclosure. FIG. 9 shows a block diagram of a communications system according to an embodiment of the present disclosure. When the awareness node is a VM at a guest operating system layer in a cloud data center, for example, a VM in a virtual switch (vSwitch), the awareness node may be a VM2 in a VM switch 2, and when the management node is a VM manager in the cloud data center, because the VM2 can identify IP layer signaling in a data packet, the VM2 can identify an attack data packet when the VM2 receives the attack data packet of an IP layer DDoS attack type (such as a malformed packet attack). Therefore, the VM2, the VM manager, the SDN controller, and the switch that are in the communications system shown in FIG. 9 can process an attack data packet by performing the foregoing method shown in FIG. 6 or FIG. 7.

Figure 10:
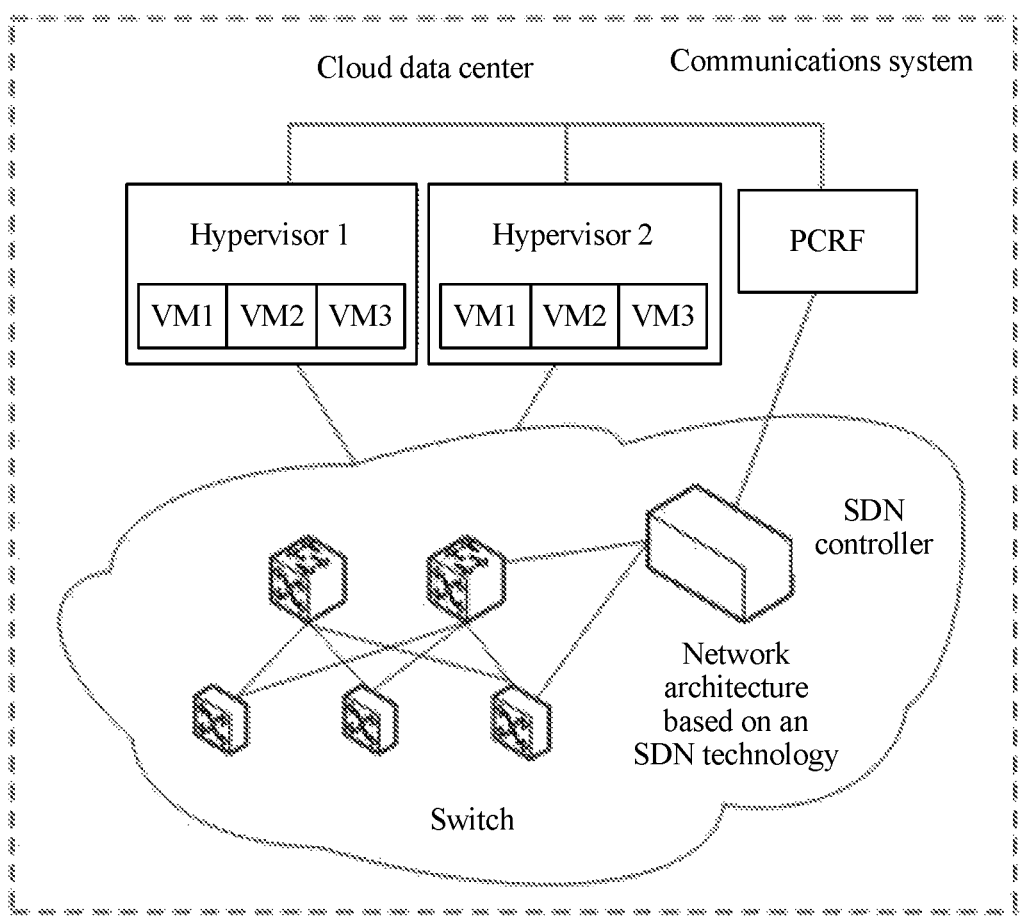
FIG. 10 is a block diagram 3 of a communications system according to an embodiment of the present disclosure.

FIG. 10 shows a block diagram of another communications system according to an embodiment of the present disclosure. When the awareness node is a hypervisor, for example, a hypervisor 2, in a cloud data center, and the management node is a PCRF in the cloud data center, and because the hypervisor 2 can identify an attack data packet by identifying service layer signaling in a data packet, for example, identify an attack data packet of a SIP based attack type by identifying SIP signaling, the hypervisor 2 can identify the attack data packet when the hypervisor 2 receives the attack data packet of the SIP based attack type. Therefore, the hypervisor 2, the PCRF, the SDN controller, and the switch can process an attack data packet by performing the foregoing method shown in FIG. 6 or FIG. 7.

This embodiment of the present disclosure provides an attack data packet processing method, which comprises identifying, by an awareness node, a data packet received by the awareness node as an attack data packet; determining description information of the attack data packet and an attack type of the attack data packet, and sending the description information and the attack type to a management node; determining, by the management node according to the attack type, a processing policy on the attack data packet of the attack type; and sending the description information and the processing policy to a switch using an SDN controller, so that the switch performs an operation indicated by the processing policy on the attack data packet with the description information, where the processing policy is used to instruct the switch to perform the operation indicated by the processing policy on the attack data packet with the description information. According to the method, network bandwidth occupied by the attack data packet when the attack data packet is transmitted in a network can be limited, and transmission of a normal data packet is ensured; a problem in the prior art that the attack data packet occupies a large quantity of network bandwidth and affects transmission of a normal data packet is resolved; further, an awareness node in a cloud data center avoids being continuously attacked by the attack data packet with the description information, thereby ensuring that a cloud server in the cloud data center can perform secure communication.

Embodiment 3

Figure 11:
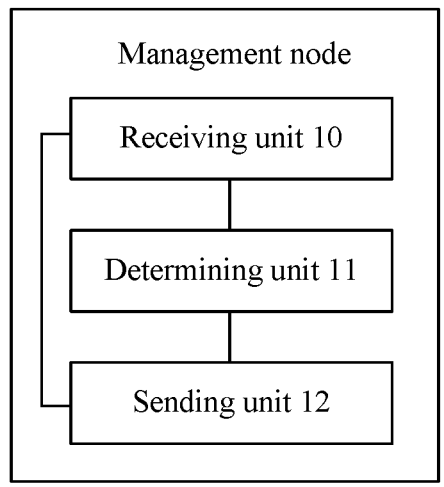
FIG. 11 is a schematic structural diagram of a management node according to an embodiment of the present disclosure.

As shown in FIG. 11, this embodiment of the present disclosure provides a management node, and the management node may include a receiving unit 10 configured to receive description information of an attack data packet and an attack type of the attack data packet, where the description information and the attack type are sent by an awareness node; a determining unit 11 configured to determine a processing policy on the attack data packet of the attack type according to the attack type received by the receiving unit 10, where the processing policy is used to instruct a switch to perform an operation indicated by the processing policy on the attack data packet with the description information; and a sending unit 12 configured to send the description information received by the receiving unit 10 and the processing policy determined by the determining unit 11 to the switch using a SDN controller, so that the switch performs the operation indicated by the processing policy on the attack data packet with the description information.

Optionally, the determining unit 11 is configured to obtain a preset processing policy on the attack data packet of the attack type according to the attack type received by the receiving unit 10.

Optionally, the determining unit 11 is configured to generate a processing policy on the attack data packet of the attack type according to the attack type received by the receiving unit 10 and a preset algorithm.

Optionally, the operation indicated by the processing policy determined by the determining unit 11 includes a processing action on the attack data packet with the description information, or a processing action on the attack data packet with the description information and a time for performing the processing action.

Optionally, the determining unit 11 is configured to, when the receiving unit 10 receives description information of multiple attack data packets and attack types of the attack data packets, where the description information and the attack types are sent by multiple awareness nodes, determine at least two same attack types according to the attack types of the multiple attack data packets, and determine, according to one of the at least two attack types, a processing policy on the attack data packet of the attack type.

Optionally, the sending unit 12 is configured to send the description information received by the receiving unit 10 and the processing policy determined by the determining unit 11 to the SDN controller using a preset communications interface, so that the SDN controller forwards the description information and the processing policy to the switch.

Optionally, the description information received by the receiving unit 10 includes a source IP address of the attack data packet, a source port number of the attack data packet, a destination IP address of the attack data packet, a destination port number of the attack data packet, and a protocol number of the attack data packet.

It should be noted that the management node provided in this embodiment of the present disclosure may be any service management node or policy management node in a cloud data center, for example, a VM manager, a VIM, a PCRF, or the like.

This embodiment of the present disclosure provides a management node, where the management node can receive description information of an attack data packet and an attack type of the attack data packet, where the description information and the attack type are sent by an awareness node, determine a processing policy on the attack data packet of the attack type according to the attack type and send the description information and the processing policy to a switch using an SDN controller, so that the switch performs an operation indicated by the processing policy on the attack data packet with the description information, where the processing policy is used to instruct the switch to perform the operation indicated by the processing policy on the attack data packet with the description information. Therefore, after the awareness node identifies a data packet received by the awareness node as the attack data packet and sends the description information of the attack data packet and the attack type of the attack data packet to the management node, the management node provided in this embodiment of the present disclosure can determine the processing policy on the attack data packet of the attack type according to the attack type and send the description information and the processing policy to the switch using the SDN controller, so that the switch performs the operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Figure 12:
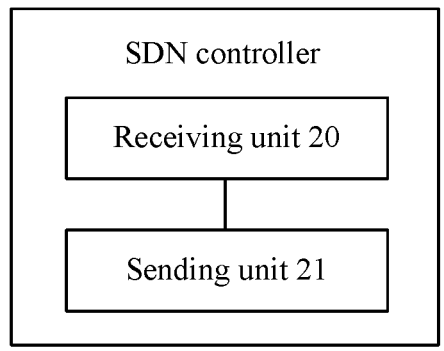
FIG. 12 is a schematic structural diagram of an SDN controller according to an embodiment of the present disclosure.

As shown in FIG. 12, this embodiment of the present disclosure provides an SDN controller, and the SDN controller may include a receiving unit 20 configured to receive description information of an attack data packet and a processing policy on the attack data packet with the description information, where the description information and the processing policy are sent by a management node; and a sending unit 21 configured to send the description information and the processing policy that are received by the receiving unit 20 to a first switch, so that the first switch performs an operation indicated by the processing policy on the attack data packet with the description information.

Optionally, the receiving unit 20 is configured to receive, using a preset communications interface, the description information and the processing policy that are sent by the management node.

Optionally, the sending unit 21 is further configured to send the description information and the processing policy that are received by the receiving unit 20 to a master SDN controller, so that the master SDN controller forwards the description information and the processing policy to a second switch, and the second switch performs the operation indicated by the processing policy on the attack data packet with the description information.

This embodiment of the present disclosure provides an SDN controller, where the SDN controller can receive description information of an attack data packet and a processing policy on the attack data packet with the description information, where the description information and the processing policy are sent by a management node, and send the description information and the processing policy to a first switch, so that the first switch performs an operation indicated by the processing policy on the attack data packet with the description information. Therefore, after an awareness node identifies a data packet received by the awareness node as an attack data packet and sends description information of the attack data packet and an attack type of the attack data packet to the management node, the management node determines a processing policy on the attack data packet of the attack type according to the attack type and sends the description information and the processing policy to a switch using the SDN controller provided in this embodiment of the present disclosure, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Figure 13:
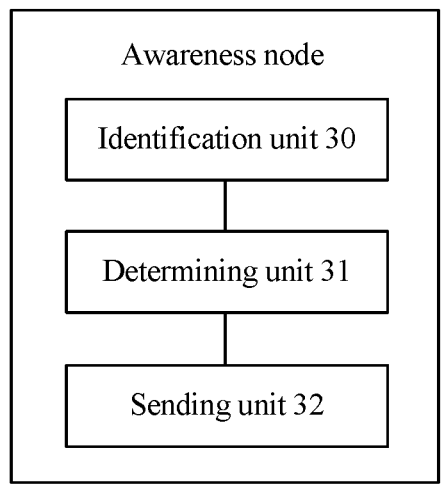
FIG. 13 is a schematic structural diagram of an awareness node according to an embodiment of the present disclosure.

As shown in FIG. 13, this embodiment of the present disclosure provides an awareness node, and the awareness node may include an identification unit 30 configured to identify a data packet received by the awareness node as an attack data packet; a determining unit 31 configured to determine description information of the attack data packet identified by the identification unit 30 and an attack type of the attack data packet; and a sending unit 32 configured to send the description information and the attack type that are determined by the determining unit 31 to a management node, where the attack type is used by the management node to determine a processing policy on the attack data packet of the attack type, and the processing policy is used to instruct a switch that forwards a data packet to perform an operation indicated by the processing policy on the attack data packet with the description information.

Optionally, the description information determined by the determining unit 31 includes a source IP address of the attack data packet, a source port number of the attack data packet, a destination IP address of the attack data packet, a destination port number of the attack data packet, and a protocol number of the attack data packet.

It should be noted that the awareness node provided in this embodiment of the present disclosure may be any cloud server that is in a cloud data center and can identify an attack data packet, for example, various service processing VMs, a hypervisor, a firewall, a load balancer, or a gateway.

This embodiment of the present disclosure provides an awareness node, where the awareness node can identify a data packet received by the awareness node as an attack data packet, determine description information of the attack data packet and an attack type of the attack data packet, and send the description information and the attack type to a management node, where the attack type is used by the management node to determine a processing policy on the attack data packet of the attack type, and the processing policy is used to instruct a switch that forwards a data packet to perform an operation indicated by the processing policy on the attack data packet with the description information. Therefore, after the awareness node provided in this embodiment of the present disclosure identifies the data packet received by the awareness node as the attack data packet and sends the description information of the attack data packet and the attack type of the attack data packet with the description information to the management node, the management node determines the processing policy on the attack data packet of the attack type according to the attack type and sends the description information and the processing policy to the switch using an SDN controller, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Embodiment 4

Figure 14:
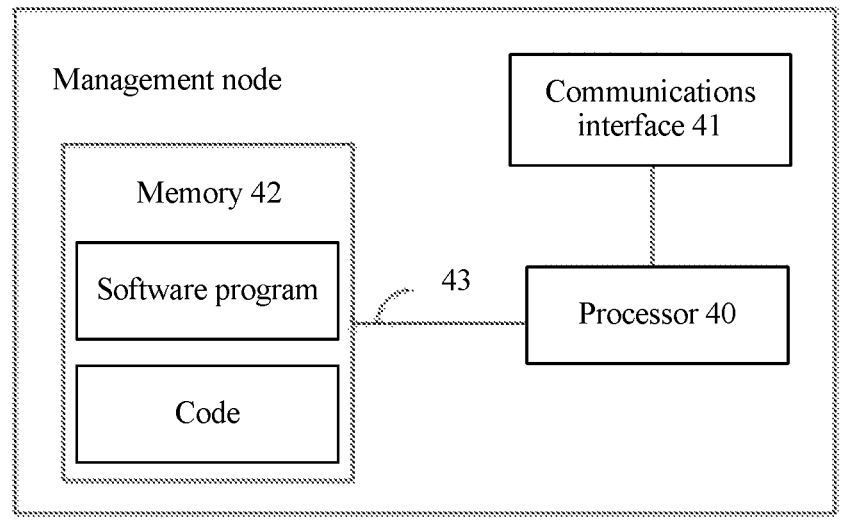
FIG. 14 is a schematic hardware structural diagram of a management node according to an embodiment of the present disclosure.

As shown in FIG. 14, this embodiment of the present disclosure provides a management node, and the management node may include a processor 40, a communications interface 41, a memory 42, and a system bus 43. The processor 40, the communications interface 41, and the memory 42 are connected and complete communication with each other using the system bus 43.

The processor 40 may be a central processing unit (CPU), or an application-specific integrated circuit (ASIC), or one or more integrated circuits configured to implement this embodiment of the present disclosure.

The communications interface 41 is configured to interact with another device, for example, interact with an awareness node, or interact with an SDN controller.

The memory 42 may include a volatile memory, for example, a random-access memory (RAM); or the memory 42 may include a non-volatile memory, for example, a read-only memory (ROM), a flash memory, a hard disk drive (HDD), or a solid-state drive (SSD); or the memory 42 may include a combination of the foregoing types of memories.

When the management node runs, the processor 40, the communications interface 41, and the memory 42 may perform a method procedure described in FIG. 2 or any one of FIG. 6 to FIG. 8A and FIG. 8B, which includes the following.

The processor 40 is configured to, using the communications interface 41, receive description information of an attack data packet and an attack type of the attack data packet, where the description information and the attack type are sent by an awareness node, determine a processing policy on the attack data packet of the attack type according to the attack type, and send the description information and the processing policy to a switch using an SDN controller, so that the switch performs an operation indicated by the processing policy on the attack data packet with the description information, where the processing policy is used to instruct the switch to perform the operation indicated by the processing policy on the attack data packet with the description information. The memory 42 is configured to store code of the description information, code of the attack type, and code of the processing policy, and a software program controlling the processor 40 to complete the foregoing process, so that the processor 40 completes the foregoing process by executing the software program and invoking the code of the description information, the code of the attack type, and the code of the processing policy.

Optionally, the processor 40 is configured to obtain a preset processing policy on the attack data packet of the attack type according to the attack type.

Optionally, the processor 40 is configured to generate a processing policy on the attack data packet of the attack type according to the attack type and a preset algorithm.

Optionally, the operation indicated by the processing policy determined by the processor 40 includes a processing action on the attack data packet with the description information, or a processing action on the attack data packet with the description information and a time for performing the processing action.

Optionally, the processor 40 is configured to, when the communications interface 41 receives description information of multiple attack data packets and attack types of the multiple attack data packets, where the description information and the attack types are sent by multiple awareness nodes, determine at least two same attack types according to the attack types of the multiple attack data packets, and determine, according to one of the at least two attack types, a processing policy on the attack data packet of the attack type.

Optionally, the processor 40 is configured to send the description information and the processing policy to the SDN controller using a preset communications interface, so that the SDN controller forwards the description information and the processing policy to the switch.

Optionally, the description information received by the processor 40 using the communications interface 41 includes a source IP address of the attack data packet, a source port number of the attack data packet, a destination IP address of the attack data packet, a destination port number of the attack data packet, and a protocol number of the attack data packet.

This embodiment of the present disclosure provides a management node, where the management node can receive description information of an attack data packet and an attack type of the attack data packet, where the description information and the attack type are sent by an awareness node, determine a processing policy on the attack data packet of the attack type according to the attack type and send the description information and the processing policy to a switch using an SDN controller, so that the switch performs an operation indicated by the processing policy on the attack data packet with the description information, where the processing policy is used to instruct the switch to perform the operation indicated by the processing policy on the attack data packet with the description information. Therefore, after the awareness node identifies a data packet received by the awareness node as the attack data packet and sends the description information of the attack data packet and the attack type of the attack data packet to the management node, the management node provided in this embodiment of the present disclosure can determine the processing policy on the attack data packet of the attack type according to the attack type and send the description information and the processing policy to the switch using the SDN controller, so that the switch performs the operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Figure 15:
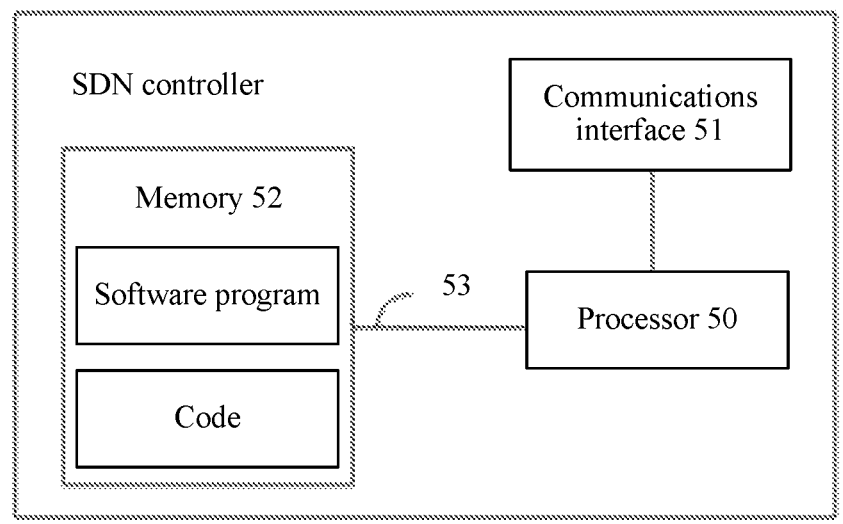
FIG. 15 is a schematic hardware structural diagram of an SDN controller according to an embodiment of the present disclosure.

As shown in FIG. 15, this embodiment of the present disclosure provides an SDN controller, and the SDN controller may include a processor 50, a communications interface 51, a memory 52, and a system bus 53. The processor 50, the communications interface 51, and the memory 52 are connected and complete communication with each other using the system bus 53.

The processor 50 may be a CPU, or an ASIC, or one or more integrated circuits configured to implement this embodiment of the present disclosure.

The communications interface 51 is configured to interact with another device, for example, interact with a management node, or interact with a switch.

The memory 52 may include a volatile memory, for example, a RAM; or the memory 52 may include a non-volatile memory, for example, an ROM, a flash memory, an HDD, or an SSD; or the memory 52 may include a combination of the foregoing types of memories.

When the SDN controller runs, the processor 50, the communications interface 51, and the memory 52 may perform a method procedure described in FIG. 3 or any one of FIG. 6 to FIG. 8A and FIG. 8B, which includes the following.

The processor 50 is configured to, using the communications interface 51, receive description information of an attack data packet and a processing policy on the attack data packet with the description information, where the description information and the processing policy are sent by a management node, and send the description information and the processing policy to a first switch, so that the first switch performs an operation indicated by the processing policy on the attack data packet with the description information. The memory 52 is configured to store code of the description information, code of the processing policy, and a software program controlling the processor 50 to complete the foregoing process, so that the processor 50 completes the foregoing process by executing the software program and invoking the code of the description information and the code of the processing policy.

Optionally, the processor 50 is configured to receive, using a preset communications interface, the description information and the processing policy that are sent by the management node.

Optionally, the processor 50 is further configured to send the description information and the processing policy to a master SDN controller using the communications interface 51, so that the master SDN controller forwards the description information and the processing policy to a second switch, and the second switch performs the operation indicated by the processing policy on the attack data packet with the description information.

This embodiment of the present disclosure provides an SDN controller, where the SDN controller can receive description information of an attack data packet and a processing policy on the attack data packet with the description information, where the description information and the processing policy are sent by a management node, and send the description information and the processing policy to a first switch, so that the first switch performs an operation indicated by the processing policy on the attack data packet with the description information. Therefore, after an awareness node identifies a data packet received by the awareness node as an attack data packet and sends description information of the attack data packet and an attack type of the attack data packet to the management node, the management node determines a processing policy on the attack data packet of the attack type according to the attack type and sends the description information and the processing policy to a switch using the SDN controller provided in this embodiment of the present disclosure, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Figure 16:
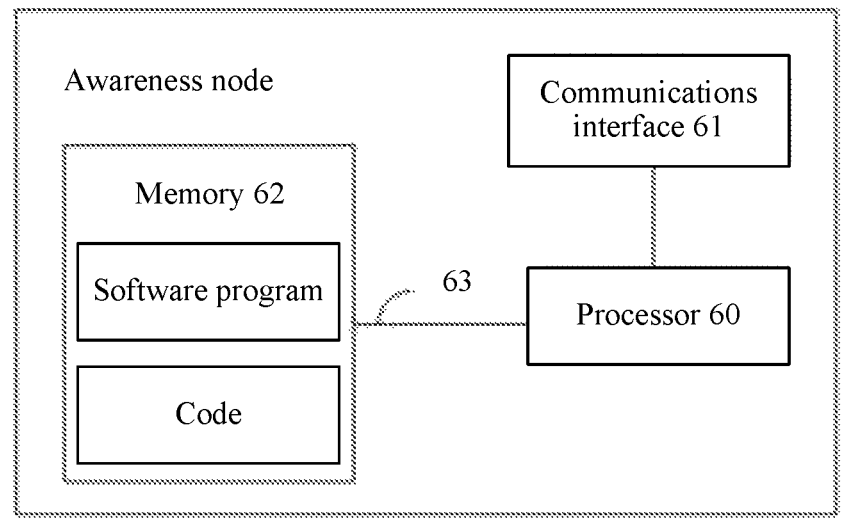
FIG. 16 is a schematic hardware structural diagram of an awareness node according to an embodiment of the present disclosure.

As shown in FIG. 16, this embodiment of the present disclosure provides an awareness node, and the awareness node may include a processor 60, a communications interface 61, a memory 62, and a system bus 63. The processor 60, the communications interface 61, and the memory 62 are connected and complete communication with each other using the system bus 63.

The processor 60 may be a CPU, or an ASIC, or one or more integrated circuits configured to implement this embodiment of the present disclosure.

The communications interface 61 is configured to interact with another device, for example, interact with another awareness node, or interact with a management node.

The memory 62 may include a volatile memory, for example, a RAM; or the memory 62 may include a non-volatile memory, for example, an ROM, a flash memory, an HDD or an SSD; or the memory 62 may include a combination of the foregoing types of memories.

When the awareness node runs, the processor 60, the communications interface 61, and the memory 62 may perform a method procedure described in any one of FIG. 5 to FIG. 8A and FIG. 8B, which includes the following.

The processor 60 is configured to identify a data packet received by the communications interface 61 as an attack data packet, determine description information of the attack data packet and an attack type of the attack data packet, and send the description information and the attack type to a management node, where the attack type is used by the management node to determine a processing policy on the attack data packet of the attack type, and the processing policy is used to instruct a switch that forwards a data packet to perform an operation indicated by the processing policy on the attack data packet with the description information. The memory 62 is configured to store code of the attack data packet, the description information, the attack type, and a software program controlling the processor 60 to complete the foregoing process, so that the processor 60 completes the foregoing process by executing the software program and invoking the code of the attack data packet, the description information, and the attack type.

Optionally, the description information determined by the processor 60 includes a source IP address of the attack data packet, a source port number of the attack data packet, a destination IP address of the attack data packet, a destination port number of the attack data packet, and a protocol number of the attack data packet.

This embodiment of the present disclosure provides an awareness node, where the awareness node can identify a data packet received by the awareness node as an attack data packet, determine description information of the attack data packet and an attack type of the attack data packet, and send the description information and the attack type to a management node, where the attack type is used by the management node to determine a processing policy on the attack data packet of the attack type, and the processing policy is used to instruct a switch that forwards a data packet to perform an operation indicated by the processing policy on the attack data packet with the description information. Therefore, after the awareness node provided in this embodiment of the present disclosure identifies the data packet received by the awareness node as the attack data packet and sends the description information of the attack data packet and the attack type of the attack data packet with the description information to the management node, the management node determines the processing policy on the attack data packet of the attack type according to the attack type and sends the description information and the processing policy to the switch using an SDN controller, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

Embodiment 5

Figure 17:
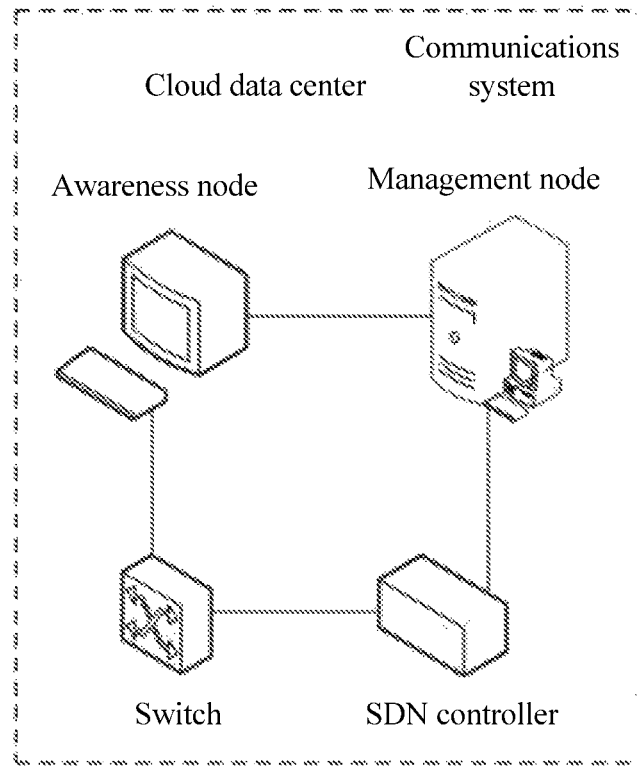
FIG. 17 is a block diagram 4 of a communications system according to an embodiment of the present disclosure.

As shown in FIG. 17, this embodiment of the present disclosure provides a communications system, and the communications system may include the management node shown in FIG. 11, the SDN controller shown in FIG. 12, the awareness node shown in FIG. 13, and a switch; or the communications system provided in this embodiment of the present disclosure may also include the management node shown in FIG. 14, the SDN controller shown in FIG. 15, the awareness node shown in FIG. 16, and a switch. The switch is a switch that is in a network architecture based on an SDN technology and is controlled by an SDN controller.

In the communications system provided in this embodiment of the present disclosure, the awareness node can identify a data packet received by the awareness node as an attack data packet, determine description information of the attack data packet and an attack type of the attack data packet, and send the description information and the attack type to the management node. After receiving the description information and the attack type, the management node can determine a processing policy on the attack data packet of the attack type according to the attack type, and send the description information and the processing policy to the SDN controller. After receiving the processing policy and the description information that are sent by the management node, the SDN controller sends the description information and the processing policy to the switch, so that the switch performs an operation indicated by the processing policy on the attack data packet with the description information.

Figure 18:
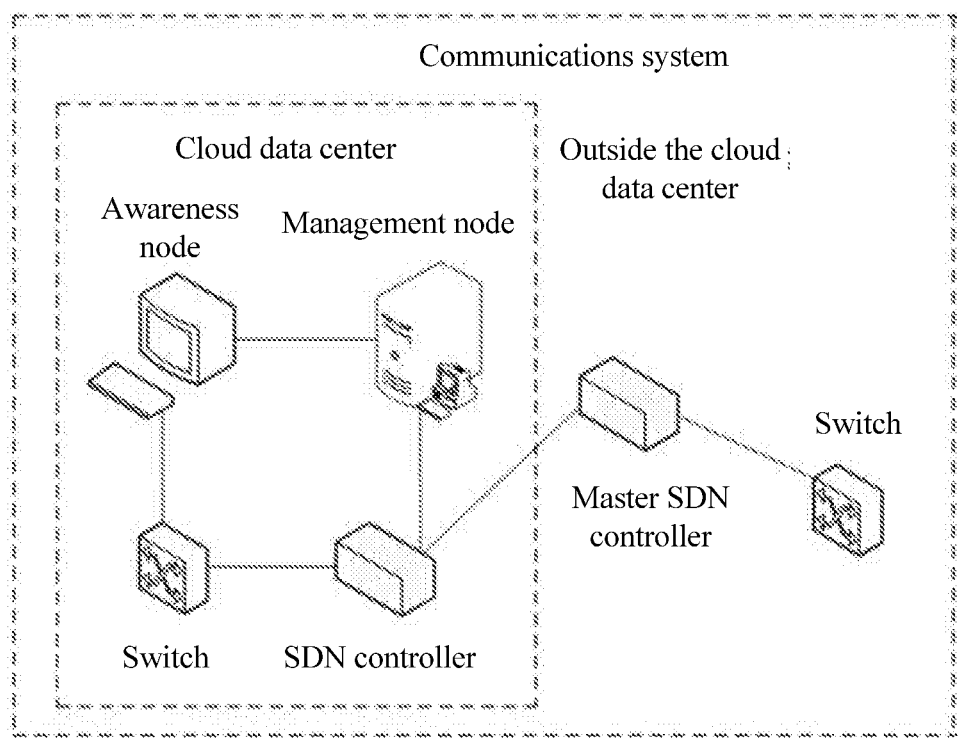
FIG. 18 is a block diagram 5 of a communications system according to an embodiment of the present disclosure.

Optionally, as shown in FIG. 18, the communications system provided in this embodiment of the present disclosure may further include a master SDN controller and a switch that is controlled by the master SDN controller. The master SDN controller is an SDN controller that is outside a data center and is connected to the SDN controller.

In the communications system provided in this embodiment of the present disclosure, after the SDN controller receives the description information and the processing policy that are sent by the management node, the SDN controller forwards the description information and the processing policy to the master SDN controller, the master SDN controller sends the description information and the processing policy to the switch controlled by the master SDN controller, so that the switch performs an operation indicated by the processing policy on the attack data packet with the description information.

According to the communications system provided in this embodiment of the present disclosure, after an awareness node identifies a data packet received by the awareness node as an attack data packet and sends description information of the attack data packet and an attack type of the attack data packet to a management node, the management node can determine a processing policy on the attack data packet of the attack type according to the attack type and send the description information and the processing policy to a switch using an SDN controller, so that the switch performs an operation indicated by the processing policy on the attack data packet with the description information. Therefore, network bandwidth occupied by the attack data packet with the description information when the attack data packet with the description information is transmitted in a network is limited, and transmission of a normal data packet is ensured; further, an awareness node in a cloud data center avoids being continuously attacked by the attack data packet with the description information, thereby ensuring that the awareness node in the cloud data center can perform secure communication.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a specific working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. A computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An attack data packet processing method, comprising:
receiving, by a management node, description information of an attack data packet and an attack type of the attack data packet, wherein the description information and the attack type are received from an awareness node;
determining, by the management node, a processing policy on the attack data packet of the attack type according to the attack type; and
sending, by the management node, the description information and the processing policy to a switch using a software-defined networking (SDN) controller, wherein the processing policy indicates an operation that the switch should perform on the attack data packet, wherein the operation is one of redirecting the attack data packet or performing a committed access rate operation on the attack data packet, wherein the management node and the awareness node are located within a cloud data center, wherein the SDN controller and the switch are located outside of the cloud data center, wherein the management node sends the description information and the processing policy to the switch using the SDN controller from a communication connection between the SDN controller and the cloud data center, wherein the SDN controller is configured to control a forwarding path and a forwarding policy of each data packet within an SDN architecture, wherein the SDN architecture comprises the SDN controller and a switch cluster that includes the switch, and wherein the switch is configured to forward data packets other than attack data packets to cloud servers in the cloud data center.

2. The attack data packet processing method of claim 1, wherein determining, by the management node, the processing policy on the attack data packet of the attack type according to the attack type comprises obtaining, by the management node, a preset processing policy on the attack data packet of the attack type according to the attack type.

3. The attack data packet processing method of claim 1, wherein determining, by the management node, the processing policy on the attack data packet of the attack type according to the attack type comprises generating, by the management node, a processing policy on the attack data packet of the attack type according to the attack type and a preset algorithm.

4. The attack data packet processing method of claim 1, wherein the operation indicated by the processing policy comprises a processing action on the attack data packet with the description information.

5. The attack data packet processing method of claim 1, wherein the operation indicated by the processing policy comprises a processing action on the attack data packet with the description information and a time for performing the processing action.

6. The attack data packet processing method of claim 1, wherein the management node receives description information of multiple attack data packets and attack types of the multiple attack data packets, wherein the description information and the attack types are received from multiple awareness nodes, and wherein determining, by the management node, the processing policy on the attack data packet of the attack type according to the attack type comprises:
determining, by the management node, at least two same attack types according to the attack types of the multiple attack data packets; and
determining, by the management node according to one of the at least two same attack types, a processing policy on the attack data packet of the attack type.

7. The attack data packet processing method of claim 1, wherein sending, by the management node, the description information and the processing policy to the switch using the SDN controller comprises sending, by the management node, the description information and the processing policy to the SDN controller using a preset communications interface.

8. The attack data packet processing method of claim 1, wherein the description information comprises a source Internet Protocol (IP) address of the attack data packet, a source port number of the attack data packet, a destination IP address of the attack data packet, a destination port number of the attack data packet, and a protocol number of the attack data packet.

9. The attack data packet processing method of claim 1, wherein the attack data packet corresponds to a malformed data packet, a data packet with a packet fragmentation exception, a data packet using an invalid Transmission Control Protocol (TCP) connection, or a data packet with an extra large data volume.

10. An attack data packet processing method, comprising:
receiving, by a software-defined networking (SDN) controller, description information of an attack data packet and a processing policy on the attack data packet, wherein the description information and the processing policy are received from a management node, wherein the management node is located within a cloud data center, and wherein the SDN controller is located outside of the cloud data center and receives the description information of the attack data packet and the processing policy on the attack data packet from a communication connection between the SDN controller and the cloud data center; and
sending, by the SDN controller, the description information and the processing policy to a first switch located outside of the cloud data center, wherein the processing policy indicates an operation that the first switch should perform on the attack data packet, wherein the operation is one of redirecting the attack data packet or performing a committed access rate operation on the attack data packet, wherein the SDN controller is configured to control a forwarding path and a forwarding policy of each data packet within an SDN architecture, wherein the SDN architecture comprises the SDN controller and a switch cluster that includes the first switch, and wherein the first switch is configured to forward data packets other than attack data packets to cloud servers in the cloud data center.

11. The attack data packet processing method of claim 10, wherein the description information and the processing policy are received from the management node, and wherein receiving, by the SDN controller, the description information of the attack data packet and the processing policy on the attack data packet comprises receiving, by the SDN controller from the management node using a preset communications interface, the description information and the processing policy.

12. The attack data packet processing method of claim 10, wherein the description information and the processing policy are received from the management node, and wherein after receiving, by the SDN controller, the description information of the attack data packet and the processing policy on the attack data packet, the method further comprises sending, by the SDN controller, the description information and the processing policy to a master SDN controller coupled to the SDN controller.

13. A management node, comprising:
a non-transitory memory storage comprising instructions; and
one or more processors coupled to the non-transitory memory storage, wherein the one or more processors execute the instructions to:
receive description information of an attack data packet and an attack type of the attack data packet, wherein the description information and the attack type are received from an awareness node;
determine a processing policy on the attack data packet of the attack type according to the attack type; and
send the description information and the processing policy to a switch using a software-defined networking (SDN) controller, wherein the processing policy indicates an operation that the switch should perform on the attack data packet, wherein the operation is one of redirecting the attack data packet or performing a committed access rate operation on the attack data packet, wherein the management node and the awareness node are located within a cloud data center, wherein the SDN controller and the switch are located outside of the cloud data center, wherein the management node sends the description information and the processing policy to the switch using the SDN controller from a communication connection between the SDN controller and the cloud data center, wherein the SDN controller is configured to control a forwarding path and a forwarding policy of each data packet within an SDN architecture, wherein the SDN architecture comprises the SDN controller and a switch cluster that includes the switch, and wherein the switch is configured to forward data packets other than attack data packets to cloud servers in the cloud data center.

14. The management node of claim 13, wherein the one or more processors execute the instructions to obtain a preset processing policy on the attack data packet of the attack type according to the attack type.

15. The management node of claim 13, wherein the one or more processors execute the instructions to generate a processing policy on the attack data packet of the attack type according to the attack type and a preset algorithm.

16. The management node of claim 13, wherein the one or more processors execute the instructions to:
determine at least two same attack types according to attack types of multiple attack data packets when description information of the multiple attack data packets and the attack types of the multiple attack data packets are received, wherein the description information and the attack types are received from multiple awareness nodes; and
determine, according to one of the at least two same attack types, a processing policy on the attack data packet of the attack type.

17. A software-defined networking (SDN) controller, comprising:
a non-transitory memory storage comprising instructions; and
one or more processors coupled to the non-transitory memory storage, wherein the one or more processors execute the instructions to:
receive description information of an attack data packet and a processing policy on the attack data packet with the description information, wherein the description information and the processing policy are received from a management node, wherein the management node is located within a cloud data center, and wherein the SDN controller is located outside of the cloud data center and receives the description information of the attack data packet and the processing policy on the attack data packet from a communication connection between the SDN controller and the cloud data center; and
send the description information and the processing policy to a first switch located outside of the cloud data center, wherein the processing policy indicates an operation that the first switch should perform on the attack data packet, wherein the operation is one of redirecting the attack data packet or performing a committed access rate operation on the attack data packet, wherein the SDN controller is configured to control a forwarding path and a forwarding policy of each data packet within an SDN architecture, wherein the SDN architecture comprises the SDN controller and a switch cluster that includes the first switch, and wherein the first switch is configured to forward data packets other than attack data packets to cloud servers in the cloud data center.

18. The SDN controller of claim 17, wherein the one or more processors execute the instructions to receive, using a preset communications interface, the description information and the processing policy that are received from the management node.

19. The SDN controller of claim 17, wherein the one or more processors execute the instructions to send the description information and the processing policy to a master SDN controller.

* * * * *